(12) United States Patent
Gilbertson et al.

(10) Patent No.: US 7,343,515 B1
(45) Date of Patent: Mar. 11, 2008

(54) SYSTEM AND METHOD FOR PERFORMING ERROR RECOVERY IN A DATA PROCESSING SYSTEM HAVING MULTIPLE PROCESSING PARTITIONS

(75) Inventors: R. Lee Gilbertson, Minneapolis, MN (US); Mitchell A. Bauman, Circle Pines, MN (US); Penny L. Svenkeson, Forest Lake, MN (US)

(73) Assignee: Unisys Corporation, Blue Bell, PA (US)

( * ) Notice: Subject to any disclaimer, the term of this patent is extended or adjusted under 35 U.S.C. 154(b) by 591 days.

(21) Appl. No.: 10/954,842

(22) Filed: Sep. 30, 2004

(51) Int. Cl.
 *G06F 11/00* (2006.01)
(52) U.S. Cl. .............................. 714/10; 714/11; 714/41
(58) Field of Classification Search .................. 714/10, 714/11, 41
 See application file for complete search history.

(56) References Cited

U.S. PATENT DOCUMENTS

| | | | | |
|---|---|---|---|---|
| 4,868,738 A | * | 9/1989 | Kish et al. ..................... 710/26 |
| 5,345,590 A | * | 9/1994 | Ault et al. ...................... 718/1 |
| 6,594,785 B1 | * | 7/2003 | Gilbertson et al. ........... 714/48 |
| 6,785,892 B1 | * | 8/2004 | Miller et al. ................ 719/313 |

* cited by examiner

*Primary Examiner*—Bryce P Bonzo
(74) *Attorney, Agent, or Firm*—Charles A. Johnson; Robert Marley; Richard J. Gregson

(57) ABSTRACT

A system and method is disclosed for performing error recovery in a data processing system that supports multiple processing partitions. One or more processors and I/O modules, as well as a portion of the address space of a main memory, is allocated to each partition. In this type of configuration, requests generated by units of multiple partitions are processed by the same queue and state logic of the main memory. When a failure occurs within one processing partition, one or more units are identified as being directly affected by the fault. All requests and responses from, and to, the affected units, as well as any logical residue of these requests and responses are removed from the shared memory queue and state logic in a manner that allows the other partition to continue issuing requests and responses to the memory in a normal manner that does not involve recovery operations.

20 Claims, 12 Drawing Sheets

SYSTEM AND METHOD FOR PERFORMING ERROR RECOVERY IN A DATA PROCESSING SYSTEM HAVING MULTIPLE PROCESSING PARTITIONS

FIELD OF THE INVENTION

The present invention relates generally to a multiprocessor system wherein processors are grouped into multiple independent processing partitions; and, more particularly, to a system and method for performing error recovery following a fault occurrence in one processing partition such that other processing partitions are isolated from the effects of the fault.

BACKGROUND OF THE INVENTION

Ever increasing demand for high throughput data processing systems has caused computer designers to develop sophisticated multi-processor designs. Initially, additional processors were provided to improve the overall bandwidth of the system. While the additional processors provided some level of increased performance, it became evident that further improvements were necessary.

One way to improve system performance involves the use of partitioning. Partitioning refers to the allocation of the system's data processing resources to a number of predefined "partitions". Each partition may operate independently from the other partitions in the system. Using partitioning, a number of parallel tasks may be executed independently within the system. For example, a first portion of the system resources may be allocated to a first partition to execute a first task while a second portion of the system resources may be allocated to a second partition to execute a second task.

System resources may be allocated to partitions by a system controller based on the tasks being executed within the data processing system at a give time. For example, a system controller may add resources to a partition that is currently processing a very large task, and may remove resources from a partition servicing a smaller task, thereby increasing the efficiency of the overall system. U.S. Pat. No. 5,574,914 to Hancock et al. describes a system and method that utilizes a site management system that is capable of moving resources between multiple partitions in this manner based on the requirements of the data processing system.

One problem with partitionable systems involves error recovery. In a system that supports multiple partitions, some resources will generally be shared between the multiple partitions. When a partition experiences a failure, some mechanism is needed to remove the affects of the fault from the common resources so that other non-failing partitions can continue to utilize that resource. For example, a common main memory may receive and process requests from more than one partition. When a fault in one partition occurs, a mechanism is needed to remove all requests and responses, as well as the affects of those requests and responses, from the various queues and other logic included within the common memory.

Prior art partitionable systems address the foregoing problem by forcing the common resource to discontinue processing requests from both the failing, as well as the non-failing, partitions after a fault is detected. The logic of the common resource is then re-initialized, as may be accomplished using a maintenance processor. Once re-initialization is complete, request processing resumes for the non-failing partitions. This method stops execution of the non-failing partitions at least temporarily, thereby impacting system throughput.

Another problem with partitionable systems is that the logic required to isolate an error within a partition is generally quite extensive. For example, prior art systems provide dedicated error reporting and recovery interfaces that can be enabled to allow error recovery activities to occur on a partition-by-partition basis. The extensive nature of the required logic increased power utilization and consumes logic resources.

What is needed, therefore, is an improved error recovery mechanism for a partitionable system that allows partitions that are unaffected by a fault to continue making requests to shared resources in a manner that is not impacted by recovery operations. The mechanism ideally takes advantage of existing system interfaces so that error reporting and recovery is completed without the use of dedicated interfaces and extensive circuitry.

SUMMARY OF THE INVENTION

The current invention provides a system and method for performing error recovery in a data processing system that supports multiple processing partitions. In one embodiment, a processing partition includes one or more I/O modules, maintenance processors, and processor nodes each containing one or more instruction processors. A partition is also allocated one or more address ranges of a shared main memory. The units of a particular partition are allowed to make requests to access only the address ranges of the shared main memory allocated to their partition. However, the memory includes queue and state logic that is used to process requests from multiple partitions. To this extent, a particular address range of the memory is allocated to a particular partition, but the logic that controls access to the various memory ranges may be shared between multiple partitions.

The main memory is made up of multiple memory units. In one embodiment, the memory within a particular memory unit can be allocated to up to two different processing partitions. In this case, a first partition is allocated, and allowed to make requests to, a first memory range, and the other partition uses a different memory range. The memory unit is therefore capable of processing requests and responses from two different processing partitions.

The logic of a memory unit includes multiple queues and state logic that control the manner in which requests and responses are processed to completion. Some of the queues and a portion of the state logic are shared between the processing partitions. As a result, when a failure occurs within one processing partition, the effects of the failure must be removed from the shared queues and state logic so that this circuitry is placed in a known, operable state. This allows requests and responses from the other processing partitions to continue utilizing this logic to make requests to memory.

According to one embodiment of the invention, the foregoing tasks are accomplished using the memory state logic. When the memory receives an error notification, the memory determines the nature of the fault. If the fault is considered non-fatal, all units in the partition except any unit directly affected by the fault may continue executing. In this case, each memory unit that includes memory allocated to the partition that contains the affected unit begins processing all pending requests and responses from, and to, the affected unit in a predetermined manner as follows. All write requests from the affected unit that were received by a memory unit prior to the error notification may be completed normally, with any modified data being stored to the memory. All write requests from the affected unit that were in-progress at the time of fault notification are completed by storing corrupted data to memory. All read requests from the affected unit may be discarded.

In addition to processing requests from the affected unit, requests to the affected unit must also be processed so that the shared memory logic is placed in a known state. Prior to the fault occurrence, the affected unit may have retained a copy of memory data that is stored within a cache of the affected unit. This data may be a read-only copy, or a read/write copy. If another unit requires access to this retained data, the other unit generates a read request to memory, which, in turn, generates a snoop request to the affected unit soliciting the return of the data and/or access rights. Such snoop requests may be queued and waiting to be issued at the time the memory receives the error notification. These pending requests are issued by the memory to the affected unit in a normal manner.

After a pending snoop request is issued to the affected unit, it is intercepted by special error logic before it can be driven onto an interface that couples the affected unit to the rest of the system. This is necessary since the affected unit may not be operational, and may therefore be incapable of generating a response to the request. This is also necessary since, in one embodiment, the interface to the affected unit is deactivated after detection of a fault associated with the unit or the interface itself.

When error logic intercepts a snoop request, the logic generates a surrogate snoop response that is very similar to the type of response that would be generated by a unit during normal processing of the snoop request. This snoop response returns any access rights that had been granted to the affected unit for the data. This snoop response is returned to the memory, which flags the requested data as corrupted within the memory.

In some cases, a snoop request may have been issued and outstanding to an affected unit at the time a fault notification is received by the memory. In this case, and depending on how the affected unit or associated interface was affected by the fault, and when the error logic was enabled, a snoop response may never be returned. To ensure that the pending snoop request receives a response and can be processed to completion so that the memory is in a known state, a special error snoop request is issued to the affected unit. This special snoop request will be intercepted by the error logic in the manner described above so that a snoop response may be returned. Return of the snoop response will allow the request that prompted the snoop request to be processed to completion. Any data returned with the snoop response is stored to memory in a corrupted state.

When a snoop response returns corrupt data, that data may be provided to a unit that is in the same processing partition as the affected unit along with an indication of the data corruption. Fault handling logic running on, or associated with, the unit that receives this corrupted data may then determine whether it is possible to "clean" the data. This determination will be based on whether the data is considered essential to continued operation of the partition. If the data is not considered essential, the receiving unit can generate uncorrupted data that is used by the unit, and eventually stored back to memory in the uncorrupted state, thereby scrubbing the fault from the memory.

The same type of processing that is described above with respect to snoop request processing may also occur after all requests and responses from, or to, the affected unit have been processed. At that time, other units that are in the same partition as the affected unit continue to make requests to the memory. These requests may request access to data that has been stored to memory in a corrupted state during the snoop response processing. This corrupted data is provided to the requesting unit, which then has the option of cleaning the data and storing it back to memory.

During the recovery procedure for a non-fatal fault, a maintenance processor or another type of diagnostic server may be employed to halt the unit that is directly affected by the fault. This may be accomplished via a scan interface, for example. The maintenance processor may then perform diagnostic and recovery operations to determine the nature of the fault. If necessary, the logic may be repaired or replaced, re-initialized, and finally re-enabled into the system.

The foregoing discussion relates to the processing of faults that are determined to be non-fatal. In this case, only the requests and responses from, or to, the unit directly affected by the fault need be processed in the manner described above. All other units in the partition continue to issue requests to the memory without being affected by the fault, with the possible exception that some requests may return corrupted data to the requester. In addition, all partitions that share a memory unit with the partition that encountered the failure are allowed to continue processing requests unaffected. That is, all units in these partitions continue to make requests to the memory in a manner that is completely unaffected by the fault. This is possible because of the fault handling procedure discussed above that places all state and queue logic that is shared between partitions in a known, operable condition.

In some cases, fatal faults are detected. These types of faults are considered fatal because they require that the memory discontinue processing requests from all units in the partition that experienced the fault. If a fault of a fatal nature is detected, requests and responses from, and to, all units in the partition must be processed in a predetermined manner. All requests and responses involving a unit directly affected by the fault are processed in the above-described manner, except that corrupted data returned with any snoop response is not provided to any other unit in the partition. This data is merely stored to the memory in a corrupted state. This data is not provided to any of the unaffected units because processing by these units must also be halted. Specifically, all pending requests and responses from, or to, units not directly affected by the fault are also processed to completion, with all read requests being discarded, and all write requests being completed normally. All snoop requests to this units are completed in a normal manner. When all pending requests and responses have been processed, processing is halted for all units in the partition so diagnostic activities may be initiated. Processing continues in a normal manner for all units in the processing partition that shares the affected memory units.

According to another aspect of the invention, memory logic shared between two partitions may be affected by a fault. For example, a queue or state logic that processed requests from two partitions may fail. In this case, all requests and responses from all units in both partitions will be processed in the manner discussed above, and both partitions will then be halted for diagnostic purposes. In an embodiment that supports multiple memory units and more than two partitions, a memory unit failure of this nature will not affect a partition that is not allocated any portion of the memory or other logic within the failing memory unit. The unaffected partition will continue to make requests to the memory unit that is operational.

According to another aspect of the invention, fault notifications are provided in a format that is consistent with other requests and responses in the system. Such notifications are issued to the memory using the same interfaces, queues, and flow control logic that are used during normal request and response processing. As a result, no special error interface is required to report or handle errors. This minimizes error recovery logic, and simplifies request and response flow control, which operates in a similar manner for normal and failure recovery processing.

According to still another aspect of the invention, memory units are intercoupled to other memory units in larger system configurations. When a memory units receives a fault notification, the memory units determines which other units in the system are included within the partition affected by the fault. The memory unit then re-issues the notification to all other memory units that include logic allocated to the affected partition. This allows each memory unit in the partition to initiate recovery processing in the manner discussed above.

In one embodiment, a method is provided for performing error recovery in a data processing system that is capable of supporting two processing partitions. Each of the processing partitions contains one or more units, with a resource of the data processing system being shared between these processing partitions. The method includes detecting an error within logic allocated to a first of the processing partitions, identifying a unit of the data processing system associated with the error, and removing from the logical state of the resource all effects of requests and responses from the identified unit to the resource while allowing the processing partition not affected by the error to continue using the resource.

In another embodiment, a data processing system is disclosed that includes multiple requesters. A first memory unit is coupled to receive requests from the multiple requesters. The data processing system also includes partition logic provided in the memory to group the requesters into multiple, independently operable, processing partitions, with more than one of the partitions sharing the first memory unit. The system further includes a first transaction tracker within the first memory unit to receive requests and responses from requesters that are included in a first of the partitions that is sharing the first memory unit. If a fault is detected and associated with a requester in the first partition, the first transaction tracker causes the effects of all pending requests and responses from the associated requester to be removed from the first memory unit while requests and responses continue to be processed from the other partitions sharing the first memory unit.

Another aspect of the invention involves a data processing system having at least two processing partitions, each including one or more requesters. Each processing partition utilizes a shared memory. A method of recovering from a fault in a first of the at least two processing partitions includes deactivating an interface associated with the fault, and reporting the fault to the shared memory using a same interface used to provide requests from the requesters to the shared memory. The method may further include removing the affects of the fault from the shared memory without discontinuing the processing of requests from one or more requesters in the other processing partition.

Still another embodiment of the invention relates to a data processing system that is capable of supporting multiple processing partitions. The data processing system has request and response processing logic to process requests and responses from units in the data processing system. The data processing system includes a fault recovery system having means for mapping each of the units to one or more of the processing partitions, and wherein at least one of the units is shared between two of the partitions. The fault record system further includes means for receiving a fault notification indicating one of the units is associated with a fault, and means for utilizing the request and response processing logic of the data processing system to remove the effects of the fault from the at least one shared unit such that units mapped to processing partitions not affected by the fault may continue to make requests and responses to the at least one shared unit.

Other scopes and aspects of the current invention will become apparent from the following description and accompanying drawings.

DETAILED DESCRIPTION OF THE DRAWINGS

Figure 1:
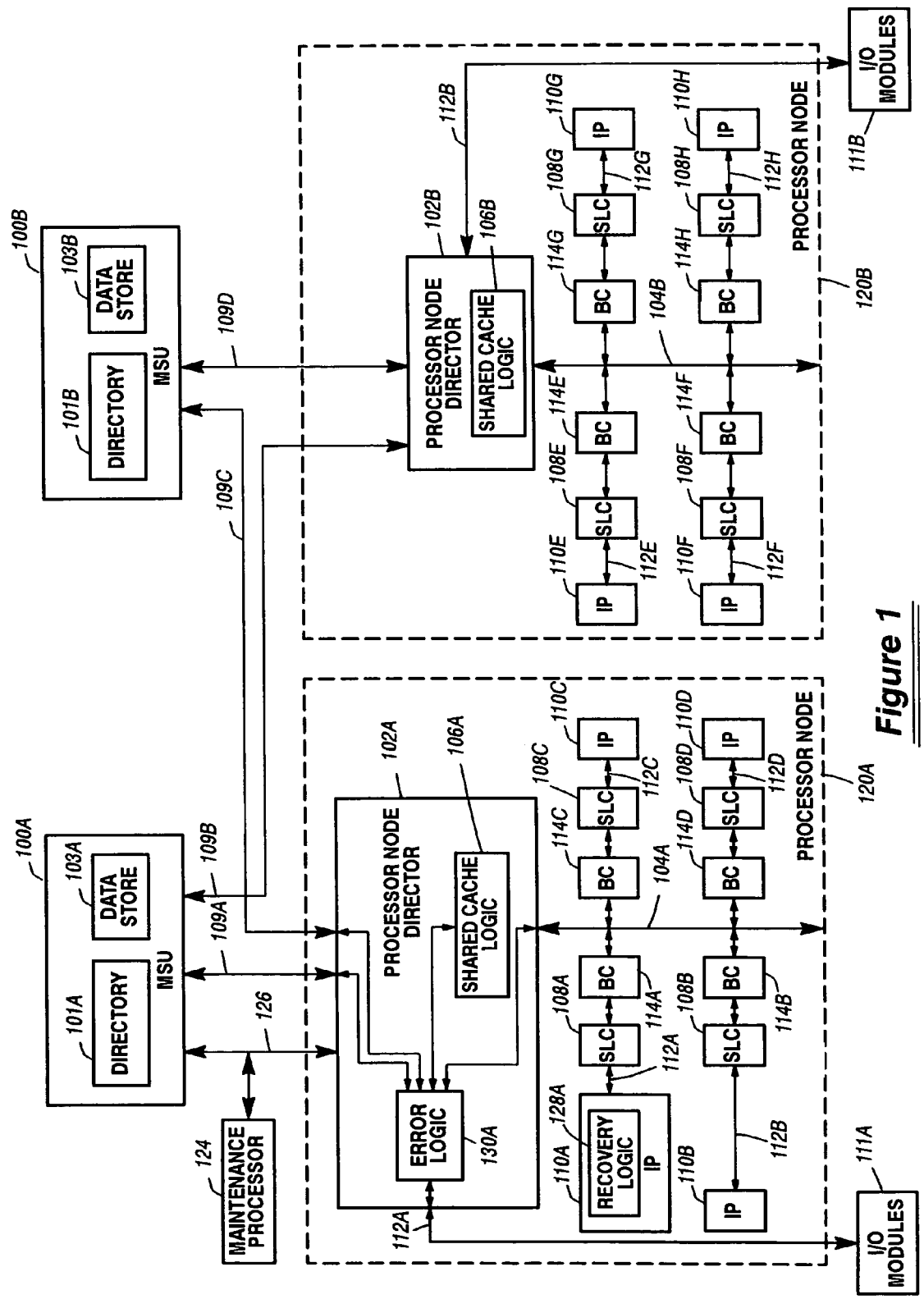
FIG. 1 is a block diagram of an exemplary data processing system that may utilize the current invention.

FIG. 1 is a block diagram of an exemplary data processing system that may employ the current invention. The system includes two memory storage units (MSUs) 100A and 100B that provides the main memory facility for the system. In a larger system, more MSUs are provided, each supporting a respective portion of the overall address range of the system.

In one embodiment, each MSU is a directory-based storage unit. In this embodiment, MSU 100A and 100B each stores data within data stores 103A and 103B, respectively. Each MSU further retains information about this stored data in directories 101A and 101B, respectively. These directories 101 store information to track the state and location of any given data to ensure that every processor is operating from the latest data copy. In the current embodiment, each directory includes an entry that tracks the state and location of each 128-byte block of memory within the associated data store, where a 128-byte block is referred to as a cache line.

Each MSU is capable of interfacing to two groups, or "nodes", of processors and cache memories. These nodes are shown as processor nodes 120A and 120B. Similarly, each processor node is capable of interfacing to two MSUs. In a larger system configuration having more than two MSUs or processor nodes, some of the processor nodes are coupled to some of the MSUs indirectly through other ones of the MSUs, as will be discussed below. Each processor node is coupled to an MSU over a high-speed MSU interface that includes data, address, and function lines. For example, processor node 120A is coupled to MSU 100A via MSU interface 109A, and is coupled to MSU 100B via MSU interface 109C. Similar interfaces are provided for processor node 120B.

Each processor node 120A and 120B includes a processor node directory (PND) 102A and 102B, respectively. A PND includes the logic necessary to interface to the high-speed MSU interface, and further includes logic to interface to a respective processor bus such as processor bus 104A or 104B. These processor buses can employ any type of bus protocol. Each PND may further include shared cache and all supporting logic, shown as shared cache logic 106A and 106B, respectively. This cache logic may include a Third-Level Cache (TLC), a Fourth-Level Cache (4LC), or some other type of cache memory. Finally, each PND includes error logic, shown as error logic 130A for PND 102A. This error logic is used during fault recovery, as will be discussed further below.

As noted above, each of PNDs 102A and 102B is coupled to a respective processor bus 104A and 104B. Each processor bus further couples to multiple local cache memories through respective Bus Controllers (BCs) 114. Each BC controls the transfer of data to and from the processor bus in a manner that conforms to the selected bus protocol. In the current embodiment, Second-Level Caches (SLCs) 108A-108D are coupled to processor bus 104A through BCs 114A-114D, respectively. Similarly, SLCs 108E-108H are coupled to processor bus 104B through BCs 114E-114H, respectively. In another embodiment, these local caches may be Third-Level Caches.

Each SLC 108 is also coupled to a respective one of the Instruction Processors (IPs) 110A-110H over a respective interface 112A-112H. For example, SLC 108A is coupled to IP 110A via interface 112A, SLC 108B is coupled to IP 110B via interface 112B, and so on. An IP may be any type of processor such as a 2200™ or A-Series™ processor commercially available from Unisys Corporation, a processor commercially available from Intel Corporation, or any other processor known in the art. Each IP may include one or more on-board caches. In the current embodiment, each IP includes a First-Level Cache (FLC). Preferably, each IP resides on an Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

In one embodiment, each of the IPs 110A-110H includes recovery logic shown as recovery logic 128A. This recovery logic may include software, firmware, microcode or any other programmable code, and/or hardware, and is provided to perform non-fatal fault recovery, as will be discussed below.

A PND, its respective processor bus, and the entities coupled to the processor bus comprise a processor node, as discussed above. Each processor node may be coupled via I/O interfaces to one or more I/O complexes. For example, I/O interfaces 112A and 112B interconnect I/O complexes 111A and 111B, respectively, to processor node directors 102A and 102B. Each of these I/O complexes contains one or more industry-standard or proprietary I/O modules that communicate with storage medium such as disk tape subsystems and communication equipment.

The system of FIG. 1 may further include a maintenance processor 124 coupled to a scan interface 126. Scan interface 126 is shown coupled to PND 102A and MSU 100A for simplicity, but it will be understood this scan interface would generally be coupled to some, or all, units within the system. In one embodiment, scan interface 126 provides serial scan capabilities, as is known in the art. The maintenance processor is capable of performing read and write operations via scan interface 126 to various storage devices within the system before, or during, normal system operation. These read and write operations may be performed to initialize logic, diagnose and recover from error conditions, and change the contents of various programmable devices, as will be discussed further below.

Next, the retrieval of data by an IP is considered. During execution, an IP is accessing programmed instructions and data from MSU 100A and its respective caches. For example, when IP 110A requires access to a memory address, it first attempts to retrieve this address from its internal cache(s) such as its FLC. If the requested address is not resident in the FLC, a request is sent to the respective SLC 108A. If the requested data is likewise not resident within the SLC, the SLC forwards the request to the processor bus 104A.

In one embodiment, all BCs on a processor bus implement a snoop protocol to monitor, or "snoop", the processor bus for requests. In the current example, BCs 114B-114D snoop the request initiated by IP 110A and SLC 108A. The snooped request is transferred by each BC to its associated SLC to determine whether that SLC has a modified copy of the requested cache line. If so, the updated data copy will be returned to requesting SLC 108A via processor bus 104A during a Processor Bus Write-Back operation. Additionally, SLCs 108B-108D may have to invalidate any stored copies of the data depending on the type of request made by SLC 108A.

PND 102A also snoops the request from SLC 108A. PND 102A determines whether shared cache logic 106A stores the most recent copy of the requested data. If so, the data will be provided by PND 102A to SLC 108A.

In some instances, data requested by IP 110A is not resident within any of the cache memories associated with processor bus 104A. In that case, PND 102A must forward the request to the appropriate one of MSU 100A or MSU 100B, depending on the request address. Logic within the PND will perform the address mapping function, and route the request over the appropriate one of interfaces 109A and 109C. Assume in this instance the request is routed to MSU 100A. The MSU then determines the location of the current copy of the requested data using information stored within its directory 101A. The most current copy may reside within data store 103A of MSU 101A. If so, the MSU provides the data directly to PND 102A.

In some cases, requested data is stored within a cache memory of a different processor node. In this instance, the way in which the request is handled depends on the type of request made by IP 110A, and the type of access rights that have been acquired by the other processor node. If IP 110A is requesting "ownership" of the data to obtain write access privileges so the data may be updated, and further if another processor node 120 currently retains ownership of the data so that the other processor node has the necessary access privileges to update the data, MSU 100A must issue a "port snoop and invalidate" request. This request will cause the processor node that retains the data to invalidate any stored data copies, and return updated data to MSU 100A so that this updated copy may be forwarded to PND 102A.

In another situation, IP 110A may be requesting ownership of data that is retained with read-only access rights by one or more other processor nodes 120. In this situation, an invalidation request is issued to these one or more processor nodes. An invalidation request causes a processor node to invalidate its copies of the data so that the data may no longer be used. If IP 110A were instead requesting read-only access to the data, the other processor nodes 120 may retain their read-only data copies, and a read-only copy is provided to IP 110A by the MSU.

In still another scenario, IP 110A may be requesting read-only access to data that is retained with ownership privileges by another node. In this case, MSU 100A issues a "port snoop" request to the other processor node. The other node may relinquish all access rights when returning the data, or, in some instances, may retain a read-only copy. The determination of whether to retain a read-only copy is largely beyond the scope of the present invention.

In any of the foregoing scenarios, MSU 100A issues an appropriate request to one or more target processor nodes 120. Each request is received by the PND of each of the target processor nodes. In response to such a request, the PND may issue a request on the respective processor bus 104 to prompt return of any modified data. Based on the particular scenario, this request may also result in invalidation of the stored copy, or the conversion of that copy to read-only data. Any updated data will be returned to MSU 100A so that it can be forwarded to the requester.

In addition to read requests as discussed above, an IP such as IP 110A may further issue a write request to store data to one of its dedicated caches. Data within these caches is eventually flushed or aged to the corresponding shared cache within the PND. In turn, data may be flushed or aged from the shared cache to be stored back to MSU 100A.

Next, the manner in which an MSU handles requests is considered in more detail.

Figure 2:
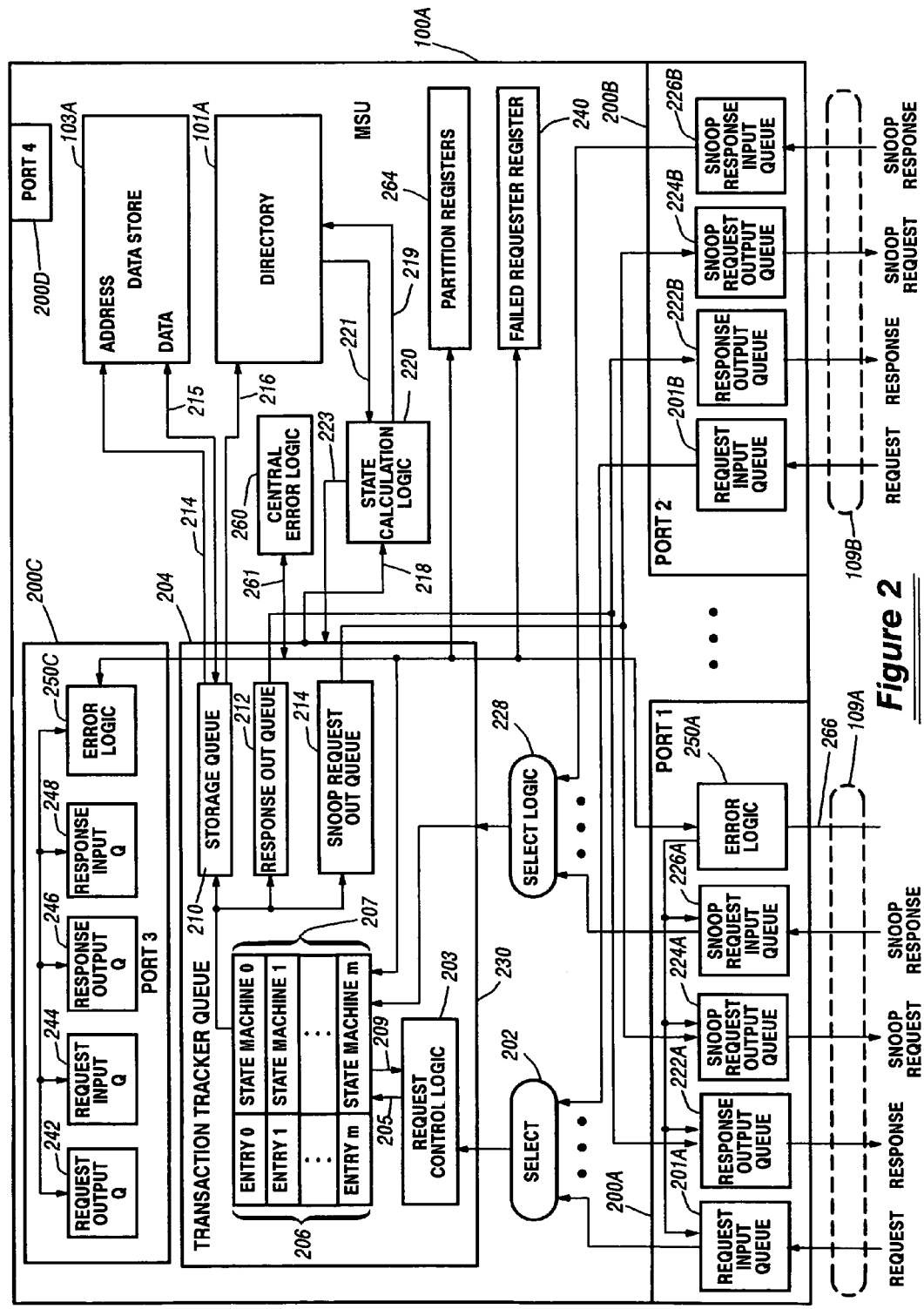
FIG. 2 is a more detailed view of the Memory Storage Unit (MSU).

FIG. 2 is a more detailed view of MSU 100A, although similar logic is included within each MSU in the data processing system of FIG. 1. As discussed above, each processor node 120 is coupled to an MSU via a respective high-speed MSU interface (shown dashed). An MI interface includes address, data, and control lines. These lines are used to transfer the address, data, and control signals, respectively, that are included within requests or responses provided by a PND to a MSU, or vice versa.

When a request or response is issued on an MI, the control signals provide information indicative of a type of request or response. These control signals further include a transaction ID that is used to match a request with a later received response, as will be discussed further below. In one embodiment, each MI is implemented as a "split transaction" interface that provides an address and associated data signals during two separate transfer operations over the MI. In this case, the transaction ID is used to match later-received data with previously received address and control signals.

Requests and responses that are issued over an MI may be transferred during multiple transmissions. For example, write requests that include a 128-byte cache line of data are transferred by a PND to an MSU during eight successive data transfer operations over the MI. Similar types of multiple, successive transmissions are provided via the I/O and processor bus interfaces when a request or response to an IP or I/O module is being transferred. Each of these data transmissions is accompanied by an error detection and correction (ECC) code that is used to correct up to four-bit adjacency errors, and detect double bit errors, on the data. The data transmissions are preceded by a transaction header that provides information about the data that will follow, including the type of transaction (read, write, etc.), and the length of the data.

Returning to FIG. 2, MSU interface 109A connects processor node 120A to port 1, 200A of MSU 100A. Similarly, MSU interface 109B couples processor node 120B to port 2, 200B, of MSU 100A. Each of these MSU interfaces includes, without limitation, request, response, snoop request and snoop response lines.

Each of the ports 200A and 200B includes a respective request input queue. Any read, write, or other type of request from a processor node is provided across a respective high-speed MSU interface and is stored within the request input queue of the corresponding port. For example, a request that is provided by processor node 120A over interface 109A will be stored temporarily in request input queue 201A of port 1, 200A. A similar request input queue 201B is included within port 200B. Each request input queue is capable of storing multiple requests that are waiting to be processed by MSU 100A.

At any given time, the request input queues may each provide a stored request to select logic 202. Select logic includes logic that selects one of the pending requests based on a fairness algorithm. The selected request is then transferred to request control logic 203. This control logic controls the transfer of requests on lines 205 to Transaction Tracker Queue (TTQ) 204 in accordance with the current invention. In one embodiment, request control logic 203 transfers a new request to TTQ 204 each clock cycle.

TTQ 204 includes entries 206, each of which is capable of storing a request. Each entry is associated with a respective one of state machines 0 through m 207. Each state machine processes the request stored within the associated request entry.

Each of the state machines 207 is coupled to several queues, shown as storage queue 210, response out queue 212, and snoop request out queue 214. When a new request is stored within TTQ 204, the respective state machine is activated to track processing activities and to control the use of these TTQ queues for that request. If the request is a write-type request, write data may be provided via interface 109A or 109B along with the address for storage in the request entry. In an alternative embodiment that utilizes a "split transaction" interface that provides an address and associated write data via interface 109A or 109B during two separate transfer operations, the data will eventually be stored in the request entry along with the associated address. For example, data may be matched with the address using a transaction identifier that accompanies both the data and the address.

Upon activation of a state machine for a request, the state machine logic generates a request entry within storage queue 210 that includes a request address and request type. The storage queue processes request entries in a first-in, first-out (FIFO) manner. When a request gains priority, the request address and any data are provided to data store 103A on lines 214 and 215, respectively. Also at this time, the request address is provided on lines 216 to directory 101A.

When a request is provided to data store 103A, a full cache line of data will be read from, or written to, data store based on the request type. Data store will also store an error correction code (ECC) that will be used to correct single-bit errors, and detect multiple-bit errors, that may occur when the data is read from data store. While data store is being accessed, the address on lines 216 reads the cache line state information for the addressed cache line from directory 101A. As discussed above, this state information indicates the location and state of the most recent copy of the associated cache line.

The state information is provided to state calculation logic 220 on lines 221, and is thereafter forwarded to TTQ 204 on lines 223 for use in fulfilling the request. This cache line state information is further used by state calculation logic 220 to determine the next cache line state for the cache line based, in part, on the request type provided by TTQ 204 on lines 218, and on the state information read from directory 101A. State calculation logic 220 then writes the updated cache line state back to directory 101A on line 219.

TTQ 204 uses the request type of the current request along with state information stored within directory 101A to determine whether a snoop request is necessary to fulfill the current request. For example, when the request is a write request or some other type of request that stores data to data store 103A, a response may be issued to the requester without having to issue a snoop request to another processor node. This response indicates the write operation has completed successfully. In another scenario, a snoop request is unnecessary when read-only access is requested and the most recent copy of the cache line is stored in MSU 100A, or one or more other processor nodes retain the data in a read-only state. In another case, a response may be returned to the requesting processor node when a cache line is to be returned with write-access privileges, and MSU 100A owns the cache line. In still another scenario, the requested cache line may be returned without the issuance of a snoop request if the directory state indicates that the cache line is already owned by the requesting processor node. This latter situation may occur, for example, if the requesting node had previously obtained the cache line in the exclusive state, had never modified it, but instead had invalidated it without notifying the MSU.

When it is determined that a response may be returned to the requesting processor node without issuing a snoop request, TTQ 204 generates the response using the cache line state information. This response includes the original transaction identifier that was provided with the request, any requested data, and a response type. If data is returned, this response type indicates the access rights that are being provided with the data. This response is stored within response out queue 212, and will be transferred to the appropriate port so that it may be forwarded to the processor node that initiated the request. In the current example, the response is transferred to response output queue 222A of port 1 200A. This response is then forwarded to processor node 1, 120A, when the response gains priority.

After a response has been queued within the appropriate one of the response output queues and any memory updates have occurred, the respective one of the state machines indicates that the request processing is completed. The request is removed from the entry within TTQ 204 such that another request may be received in its place.

As noted above, in some cases, a snoop request must be issued to another processor node before a response may be issued to the requester. This occurs, for example, when the MSU cannot return the cache line in the required state. For example, if the request type indicates that the cache line should be returned with write-access privileges, and if a valid copy of the cache line resides within another processor node, a snoop request must be generated. In this case, the snoop request is issued to invalidate the cache line copy residing within that other processor node, and to prompt the return of any modified data.

If a snoop request is necessary, TTQ 204 generates the request, which is stored within snoop request out queue 214. This request includes a transaction id generated by TTQ 204, a snoop request type, and an address. The request is transferred to the snoop request output queue(s) of the appropriate port(s) based on the processor node(s) that have a copy of the requested cache line. In the current example, it will be assumed that processor node N 120B owns the requested cache line. The snoop request is therefore transferred to snoop request output queue 224B of port 2 200B. A similar queue is provided for each of the other ports. This request is transferred to PND 102B to be processed in the manner discussed above.

Eventually, processor node 120B will return a snoop response to snoop response input queue 226B of port 2 200B. This snoop response is provided to select logic 228, which selects one of the pending responses for presentation to TTQ 204 using a rotational fairness algorithm. The selected snoop response will be assigned to the state machine that is still processing the initial request using the transaction id that was included with the snoop request and returned with the snoop response.

After the snoop request is provided to the appropriate one of state machines 207 within TTQ 204, it may be used to immediately generate a response to the requester. This is possible if the snoop response returned data, and if the response type can be determined without another reference to directory 101A. If this is the case, the state machine generates a response that is stored within response out queue 212. This response includes the cache line data returned from processor node 120B along with a response type indicating the state of the cache line. This response will be transferred to the response output queue of the appropriate port in the manner discussed above. In the current example, the response is transferred to response output queue 222A of port 1, 200A, so that it can be forwarded to processor node 1, 120A.

In addition to generating a response to the requesting processor node, the state machine further generates a request entry within storage queue 210. This request, which will be processed on a FIFO basis as discussed above, will store the updated data returned from processor node 120B to data store 103A. This request entry within storage queue 210 will also initiate a read operation to read the cache line state information from directory 101A onto lines 221. State calculation logic uses the current cache line state information as well as the request type and the snoop response type provided by TTQ 204 on lines 218 to update the cache line state information. The updated cache line state information is stored back to directory 101A on lines 219.

After the modified data has been stored to data store 103A and the cache line state information has been updated, the original request is removed from TTQ 204. This allows TTQ 204 to receive another request from one of the ports based on the fairness algorithm practiced by select logic 202.

The foregoing paragraphs assume that data was returned with the snoop request. This will only occur, however, if a processor node that had ownership of the cache line had actually modified the cache line data. In all other instances in which the cache line was not modified, the snoop response will only return ownership, or, if the cache line had been retained in the shared state, indicate that invalidation had been completed. In this case, the response can only be fulfilled after the data is retrieved from data store 103A. Therefore, an entry is generated within storage queue 210. When the request entry gains priority, the requested cache line is read from data store 103A on lines 215, and is used by the associated state machine to generate a response in response out queue 212.

When the response has been generated within response out queue 212, it is transferred to response output queue 222A to be provided to processor node 120A in the current example. The request processing is then considered complete, and the request may be removed from TTQ 204 so that another request may be received.

The above description discusses the processing by MSU 100A of requests and responses involving processor nodes 120A and 120B to which MSU 100A is directly coupled. MSU 100A may be coupled to additional processor nodes via port 3, 200C, and port 4, 200D. Each of these ports is adapted to couple to another MSU via a MSU-to-MSU interface. Each MSU can, in turn couple to up to two additional processor nodes, as is discussed below. Each of these ports includes a request output queue, a request input queue, and response output queue, and a response input queue. For port 3, 200C, these queue structures are shown as request output Q 242, request input Q 244, response output Q 246, and response input Q 248. Similar queue structures are provided for port 4, 200D. Use of these queue structures is discussed further below.

As may be appreciated, a large number of requests may be issued to MSU 100A by the various IPs and I/O modules in the system within a relatively short period of time. If this occurs, shared resources within the MSU such as TTQ 204 may not have the capacity to process all of these requests. In this case, a request throttling mechanism must be invoked. One type of throttling mechanism involves causing some of the requests to be retried at a later time, as follows. Assume that a valid request is stored within TTQ 204. The storing of this request causes a predetermined usage level to be reached for the TTQ. This usage level is defined using selectable threshold values. When this level is reached, the TTQ initiates the retry procedure. The state machine 207 associated with this request stores an indication in the TTQ entry indicating that the request is to be retried. The state machine then generates a retry response, which is stored to response out queue 212. When this response is issued to the requester, the read request is considered complete, and is removed from the TTQ entry.

When a PND receives a retry response from an MSU, the associated read request is retained by the PND a predetermined period of time, and is then re-issued to MSU 100A. According to one embodiment, only read requests are retried in this manner, since write requests may be completed relatively expeditiously, and do not depend upon the potential issuance of a snoop request. In another embodiment, other types of requests may be retried in addition to, or instead of, read requests. The significance of retry operations in regards to the current invention will be discussed below.

In addition to the request handling logic, FIG. 2 also illustrates logic that is used during fault recovery in a manner to be discussed below. In particular, MSU 100A includes central error logic 260, which is a state machine that coordinates the activities that occur within MSU 100A after a failure is detected. Central error logic 260 is coupled to error logic within each of the ports via interface 261. For example, error logic 250A and 250C is shown provided for ports 200A and 200C, respectively. Similar logic is provided for each of the other ports of MSU 100A. This logic interfaces to a respective Present signal received. For example, Present signal 266 included within MI 109A is shown being provided to error logic 250A. A similar Present signal that is included on MSU-to-MSU interface 304 is monitored by error logic 250C, and so on. These signals are used during recovery operations, as will be discussed below. After a failure is detected, this logic controls request and response processing within the queues of the respective port, and isolates the port from the interface.

Central error logic 260 is further coupled to several registers, including a Failed Requester Register (FRR) 240, which is a master-bitted register used to record which units have failed. This logic also interfaces to partition registers 264. These registers are used to record which units are included within a particular processing partition. Processing partitions are discussed in reference to FIG. 3 below.

The above description illustrates the manner in which requests are handled in a system such as that shown in FIGS. 1 and 2. This type of system may be configured into multiple processing partitions. A processing partition is a group of resources that executes in a cooperative manner to perform one or more assigned tasks. For example, a partition may be formed that includes one or more predetermined IPs, I/O modules, and one or more predetermined memory ranges within one or more MSUs. A second partition may be created to include different IPs, I/O modules, and one or more different memory ranges within the same, or different, MSUs. Each of these partitions may operate independently from the other to execute assigned tasks in parallel within the system. For example, a first partition may be supporting a transactional environment that is receiving requests from multiple users in real-time. Another partition may be processing batch jobs, and so on. As system requirements change, these partitions can be re-defined. For instance, if needed, all resources may be allocated to a single partition and assigned to execute a high-priority task.

In one embodiment, partitions are created by maintenance processor 124, which programmably enables appropriate system interfaces so that units allocated to the same partition can communicate with each other. The maintenance processor also initializes registers within each of the units so that each unit is aware of the processing partition in which it is included. Creation of partitions can occur at system initialization time, or any time thereafter. Similarly, partitions can be modified as system requirements change.

In one embodiment, a system such as shown in FIG. 1 is partitioned on a processor node basis. That is, all of the units included within a processor node, and any interconnected I/O modules, are always included in the same partition. In contrast, an MSU may be shared between, at most, two partitions. This embodiment is illustrated in FIG. 3, as will be discussed below.

When an MSU is shared between two partitions, some of the MSU logic is strictly dedicated to a particular partition, whereas other logic within the MSU is shared between both partitions. For example, in a multi-partition configuration, each of ports 200A-200D of MSU 100A will be dedicated to a particular partition. A port will only handle requests from units within its partition. Other MSU logic such as TTQ 204, data store 103A, and directory 101A will be shared between the two partitions, and will process requests from both partitions. When data store 103A and directory 101A are shared between two partitions, one or more address ranges within data store 103A will be allocated to a first partition, and different address ranges will be allocated to the other partition. That is, cache lines are not shared between two partitions, and processors within different partitions cannot gain access to a same cache line, as will be discussed below. In another embodiment, this restriction is not enforced.

Figure 3:
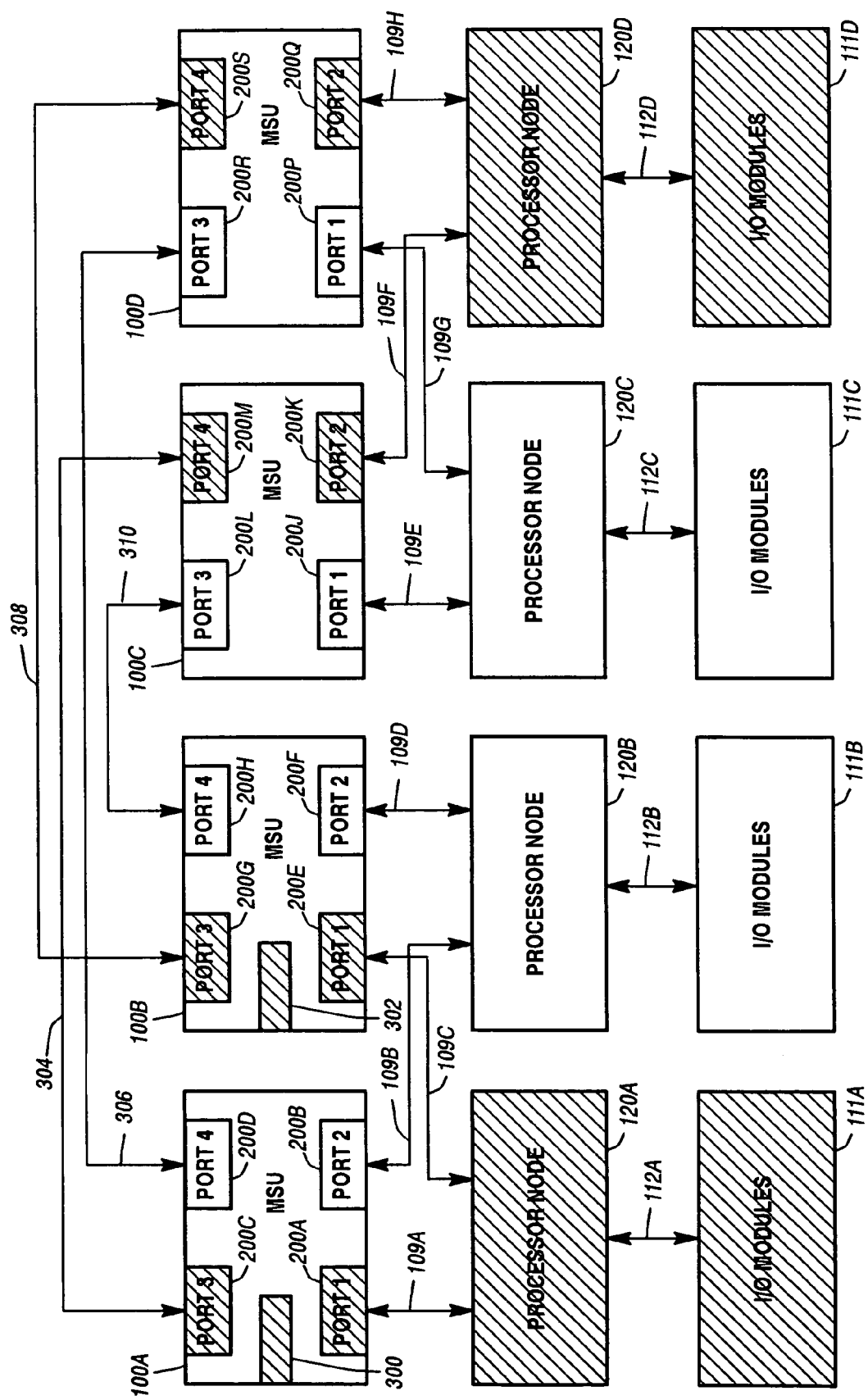
FIG. 3 is a block diagram conceptually illustrating one aspect of the present invention.

FIG. 3 is a block diagram of a data processing system such as shown in FIG. 1 that includes multiple partitions. The system of FIG. 3 includes the various units shown in FIG. 1. The system further includes additional processor nodes 120C and 120D, MSUs 100C and 100D, I/O Modules 111C and 111D, and the interconnecting interfaces. As is evident, each of the processor nodes 120C and 120D is directly coupled to MSUs 100C and 100D in the same manner processor nodes 120A and 120B are each directly coupled to MSUs 100A and 10B.

In the system of FIG. 3, MSUs are coupled to other MSUs via ports 3 and 4. For example, MSU 100A is coupled via port 3, 200C, to a port 4 of MSU 100C by MSU-to-MSU interface 304. MSU 100A is further coupled via port 4, 200D, to a port 3 of MSU 100D by MSU-to-MSU interface 306. Similar MSU-to-MSU interfaces 308 and 310 interconnect the remaining ports of MSUs 100B-100D.

In a system such as that shown in FIG. 3, a processor node issues requests directly to the MSUs to which it is immediately coupled. For example, processor node 120A issues requests directly to MSUs 100A and 100B. A processor node is also able to issue requests indirectly to the remaining MSUs through the MSU-to-MSU interfaces. For instance, processor node 120A may issue a request to MSU 100C via MSU 100A and MSU-to-MSU interface 304. Alternatively, processor node 120A may issue such a request via MSU 100B and MSU-to-MSU interface 310. This is discussed further below.

As described above, the system of FIG. 3 includes two processing partitions. According to the current embodiment, partitioning is performed so that all units of a processor node, as well as any interconnected I/O modules, are included within the same partition. As such, a first partition (shown by hash markings) includes processor nodes 120A and 120D, and I/O modules 111A and 111D. This partition further includes a first address range 300 within MSU 100A, and a second address range 302 within MSU 100B. The remaining address space within MSUs 100A-100D is allocated to a second partition, which also includes processor nodes 120B and 120C, and I/O modules 111B and 111C.

In the manner previously described, when MSUs are shared between two partitions, each port is dedicated to only a single partition. For example, port 1, 200A, of MSU 100A and port 1, 200E, of MSU 100B (shown hashed) are dedicated to use by the first partition. Additionally, port 2 of MSU 100C and port 2 of MSU 100D are both dedicated to the first partition, and are needed to allow processor node 120D and I/O modules 111D to make requests to the memory ranges 300 and 302 of the first partition. Such requests may be passed to port 2 of MSU 100C via MI 109F, then forwarded from port 2 to port 4 of MSU 100C, and finally provided to port 3 of MSU 100A via MSU-to-MSU interface 304. Similar requests may be provided to MSU 100D, and then passed from MSU 100D to MSU 100B via ports 2 and 4 of MSU 100D and MSU-to-MSU interface 308. All of these ports (shown dashed) are allocated to the first partition.

Using ports that are dedicated to a particular partition to pass requests between MSUs is best described by example. Assume that a portion of memory within MSU 100C is allocated to the first partition of FIG. 3. Further assume that IP 110A issues a request to access a cache line of this memory within MSU 100C. This request may be first transferred to MSU 100A, where it is stored within request input queue 210A of port 1. In a system such as that shown in FIGS. 2 and 3, such a request would be routed via a port-to-port path of MSU 100A (not shown in FIG. 2 for simplicity) from the request input queue of port 1 to request output queue 242 of port 3. This request is then transferred to a request input queue of port 4 in MSU 100C. From there, this request can be transferred to an entry in a TTQ of MSU 100C for presentation to the memory.

It may be noted that it is also possible to route a request of the type discussed above from processor node 120A to MSU 100C via MSU 100B. According to this alternative approach, the request may be first transferred to an input request queue of port 1, 200E of MSU 100B. From there, it may be transferred to an output request queue of port 4, 200H, of MSU 100B. The request may then be passed via MSU-to-MSU interface 310 to a request input queue of port 3, 200L, of MSU 100C. However, since port 4 of MSU 100B and port 3 of MSU 100C are not dedicated to the same partition as that which includes processor node 120A, this alternative routing will not be utilized in the instant case. Instead, the first alternative will be selected by logic that performs request routing. This routing logic is included within each PND and MSU, and is configured by maintenance processor 124 each time the system is re-partitioned. This logic performs routing so that requests generated by requesters in the first partition are routed using the port logic that is included within this first partition, and so on.

It may be noted that it is possible to configure systems larger than that shown in FIG. 3, and which include additional MSUs, processor nodes, and I/O modules. In these systems, a requester such as processor node 120A may issue a request that is first routed to a directly coupled MSU such as MSU 100A. This request may then be passed to another MSU such as MSU 100C. From there, the request may be further routed to still another MSU that stores the memory that is the target of the request. Responses are returned to the requester in a similar manner. Similarly, an MSU can issue snoop requests to processor nodes and I/O modules that are coupled to a different MSU using these MSU-to-MSU interconnections. In each case, the routing of the requests is performed using logic dedicated to the same partition as the requester. This will be discussed further below.

In a system such as that shown in FIG. 3, special concerns arise with respect to error recovery procedures. For example, assume that a failure occurs within any of the logic included within the first partition. It is important to prevent the fault from affecting operation of the other partition. To prevent such fault migration from occurring, all requests from the failing partition must be removed from the logic that is shared between multiple partitions within the MSUs. If this is not accomplished, these requests may interfere with requests from the non-failing partitions. In prior art systems, this type of fault recovery could only be accomplished by stopping all partitions. A maintenance processor then reinitialized the logic and corrupted memory locations in the failing partition to a known state before restarting the non-failing partition(s). The current invention provides a mechanism for allowing the non-failing partition(s) to continue operating while removing all logical effects of the failing partition from the logic shared between the partitions. In addition, if a non-critical requester within a partition fails, the remaining requesters within the partition are allowed to continue operating, as are all requesters in the non-failing partitions.

In addition to the foregoing, the current recovery system does not require the use of specialized recovery interfaces. All interfaces that are provided to support normal transaction processing may also be employed to perform recovery actions. Moreover, the same request and response processing logic, including TTQ 204 and the various queues within the MSU, are used to process requests and responses from failing units much as those requests and responses would be processed if no error had occurred so that the affects of these requests and responses can be removed from logic shared between multiple partitions. This is an improvement over prior art systems, which generally utilize specialized synchronous interfaces and extensive recovery logic to perform error recovery operations. The current system simplifies the logic that supports error recovery, and simplifies flow control related to the processing of requests and responses, as will be discussed below.

Before considering the specific error recovery scenarios supported by the current invention, a brief description of the various interfaces of FIGS. 1-3 is provided. As previously discussed, MIs 109A-109D each includes data, address, and control signals. The MSU-to-MSU interfaces, processor bus interfaces 104A-104B and the I/O interfaces 112A and 112B are similarly configured.

One of the control signals provided in each of the MSU-to-MSU interfaces, the MIs and the I/O interfaces is a Present signal that is driven active when two or more operational units are interconnected over the interface. If a unit detects that its own logic is failing, that unit can drive the Present signal within each of its interfaces to an inactivate state so that these interfaces are no longer operational. In addition, if a unit detects that another unit to which it is connected is failing, the non-failing unit can force the Present signal of the interconnecting interface to an inactive state. This prevents the failing unit from issuing further requests or responses over that interface. In this case, the unit detecting the fault may further force other interfaces that are included in the same partition as the failing unit to an inactivate state. This will be discussed further below. Finally, if any unit detects a potential fault on the interface itself, the unit may force the Present signal to an inactive state. Detection of a fault and subsequent deactivation of the Present signal on the appropriate interface initiates error recovery actions.

One or more recovery scenarios are possible in a system such as shown in FIG. 1. The recovery scenario that is initiated will be determined by which type of requester and/or interface is associated with the potential fault. According to a first recovery scenario, assume PND 102A detects a failure in a transaction issued by one of I/O modules 111A. For example, the PND may detect that one or more fields within a transaction received from one of the I/O modules is not set to a valid value. As another example, the length of the transaction may not correspond with the length specified in the length field of the transaction header. As yet another example, a parity error may occur on any of the one or more transmissions included within the transaction. Other errors are possible. If such an error is detected by PND 102A, the PND may force the Present signal on I/O interface 112A to an inactive state. Alternatively, if one of I/O modules 111A detects either an error that is internal to its logic, or detects an error on I/O interface 112A, it may also deactivate the Present signal on this interface.

After PND 102A either deactivates the Present signal on I/O interface or detects that it has been otherwise deactivated, the PND generates one or more error flits. An error flit is a transaction that has a special code in the header that indicates an error has occurred, and identifies the requester associated with the error. In the instant example, the requester is identified as one of the I/O modules 111A. Other requesters could be identified as one of the PNDs or a maintenance processor, as will be discussed further below. The error flit is then provided to each unit that is associated with the partition affected by the failure.

According to the current example, PND 102A provides the error flit to each MSU that includes memory or other logic that is allocated to the same partition as the failing requester. This is determined using partition registers within the PND logic, which are initiated by maintenance processor 124 each time the system is re-partitioned. The MSU that is to receive the error flit is identified in a destination field of the error flit. In the current scenario, an error flit is generated for each of MSUs 100A and 100B, since these units include memory and other logic that is included within the same partition as I/O modules 111A.

If one or both of MSUs 100C and/or 100D included memory within the partition affected by the error, an error flit would also be generate for these MSUs. An error flit generated for MSU 100C could be routed via either MSU 100A or MSU 100B. For example, if the error flit is provided to MSU 100A, the destination field identifying MSU 100C will be recognized by logic within port 1, 200A. This logic will cause the error flit to be routed to port 3, 200C, so that it can be provided via interface 304 to MSU 100C. A similar operation would occur if that error flit were routed via MSU 100B.

In addition to generating the error flits, PND 102A will undergo additional recovery actions associated with deactivated I/O interface 112A. In particular, PND 102A will ignore any future request or response transactions from this interface. Requests and responses from all I/O modules 111A that are queued within PND 102A awaiting transfer to an MSU will be discarded. Moreover, any requests or responses to the I/O modules 111A from an MSU that are queued within PND 102A will be discarded. Recall that such requests from an MSU to an I/O module include snoop requests soliciting return of data and/or ownership for data retained by the I/O modules. Responses from an MSU to an I/O module include acknowledgements to write requests, and the return of data and/or ownership rights in response to read requests.

In some instances, PND 102A may be in the process of transmitting a request or response transaction from an I/O to an MSU when the Present signal on I/O interface 112A is deactivated. Recall that such a transaction includes a header that provides information about the type of request or response that is being transmitted. This header includes a length field indicating the length of any data that will be provided after the header during additional transmissions. If the Present signal is deactivated while a transaction is being transmitted to an MSU, the PND 102A completes the transaction so that the size of the transaction coincides with the value specified in the length field, thereby preventing the MSU from detecting a transaction error. To complete an in-progress transaction after the Present signal is deactivated on the I/O interface, PND 102A will "pad" any in-progress transaction that was initiated by one of I/O modules 111A and that is being provided to either MSU 100A or MSU 100B such that the remaining data transmissions contain data that is marked as corrupted. The data is designated as being corrupted by using a predetermined ECC code that accompanies each of these transmissions. PND 102A will pad the data so that the total number of bytes transferred during the one or more remaining data transmissions in the transaction corresponds with the data length field included in the transaction header.

For reasons to be discussed further below, after the Present signal is deactivated on I/O interface 112A, PND 102A may continue to receive additional requests and responses from MSUs that are directed to I/O modules 111A. Any responses of this nature may be discarded by the PND 102A. Any requests may include snoop requests that solicit return of data and/or access rights for data retained by a failing I/O module. During normal operation, PND 102A forwards snoop requests on I/O interface 112A to the I/O modules. However, deactivation of the Present signal on I/O interface 112A makes the interface inoperable. Therefore, instead of transmitting the snoop request to I/O modules 111A, error logic 130A within the PND 102A uses these requests to generate responses that can be returned to the MSU. Specifically, error logic 130A will change the transaction type field within the transaction header from a request to a response indication. The transaction identifier that is included within the header of the request is included in the response header, and will be used by the MSU to match the request with a response. Finally, a status field of the transaction header will be set to a value designated "Master Abort". PND 102A will route this snoop response back to the MSU that initiated the request. The manner in which an MSU processes this type of response is discussed further below.

The foregoing discusses the recovery actions taken within a processor node after deactivation of a Present signal on an I/O interface. Recovery actions are also initiated within an MSU when that MSU receives an error flit from the processor node that identifies that MSU in the destination field. For example, in the current scenario, MSU 100A will receive an error flit from processor node 120A indicating that MSU 100A is the destination unit. This error flit is received by port 1, 200A, and is transmitted to TTQ 204, where it is detected by central error logic 260. Central error logic uses a field within the error flit that identifies the failing unit(s) to make a record of the failure. In one embodiment, this record is maintained by setting an appropriate bit in the master-bitted Failed Requester Register (FRR) 240 (FIG. 2) to indicate which requesters have failed. In this embodiment, a requester may include a PND, a group of I/O modules such as I/O modules 111A or 111B, or a maintenance processor such as maintenance processor 124.

When TTQ 204 receives the error flit, TTQ 204 initiates recovery sequences for each valid request stored within an entry 206 of TTQ that is either from a failed requester, or that involves a request such as a snoop request to a failed requester. In general, this request processing occurs as follows. If a request is a read request from a failed requester as indicated by FRR 240, the associated state machine removes the request from the TTQ 204 so long as the read request is not associated with a previously issued snoop request. For read requests from a failed requester that have already resulted in the issuance of a snoop request, the corresponding snoop response must be received by the TTQ before the request may be discarded.

When the snoop response is finally received, and assuming the response was provided by a non-failing requester, any access rights returned with the snoop response will be recorded within directory 101A. Any returned data will be stored within data store 103A, but need not be forwarded to I/O modules 111A, since I/O interface 112A is disabled. Therefore, in one embodiment, TTQ does not generate a response to I/O modules 111A at all. In another embodiment, a response may be generated and forwarded to PND 102A in the normal manner. PND 102A then issues that response to disabled I/O interface 112A as a way to discard that response without requiring any special response handling capabilities.

The above discussion assumes that the snoop response is returned by an operational requester. Those cases associated with a snoop response returned by a failing requester are discussed further below.

Some TTQ entries may store read requests from a failed requester that have already resulted in the queuing of read requests to storage queue 210 at the time the error flit is received by MSU 100A. In one embodiment, these requests queued within storage queue 210 are allowed to be presented to data store 103A for processing. If the request requires the issuance of a snoop request to another unit, that snoop request will still be issued. Any access rights returned with the snoop response from a non-failing requester will be recorded within directory 101A. If the request does not require the issuance of a snoop request, the data may be obtained directly from data store 103A. In either case, the requested data will be included with a response that is provided by data store 103A to TTQ 204. In one embodiment, the response may be forwarded to PND 102A, which will then issue it to the disabled I/O interface as a means of discarding it. In an alternative embodiment, the TTQ may merely discard this response rather than returning it to the failed requester. The former approach allows the response to be handled in the same manner as that response would otherwise be handled in the absence of an error so that no special logic is required for response handling.

If a request is instead a write request from a failed requester, that write request is completed. Such write requests consist of either requests that were queued within TTQ 204 or storage queue 210 before the failure was detected, or that were in-progress during the failure detection, and are padded with data that is indicated as being corrupted, as was discussed above. In the former instance, the write operation is completed so that the uncorrupted data is stored to data store. In the latter instance, the data is stored within data store 103A with ECC bits that are set to a predetermined ECC designation to indicate that the data is corrupted. In addition, a special status indicator is stored in the directory entry of directory 101A for that cache line to indicate the cache line is corrupted. If this cache line is requested by a non-failing requester in the future, the corrupted data will be provided to that requester, which may then initiate recovery actions in a manner to be discussed below.

In an alternative embodiment, all write requests from a failing requester that are pending within TTQ 204 at the time the MSU receives the error flit may be deleted from the TTQ. In this case, the cache lines that are the targets of the discarded write requests may be corrupted at a later time as other non-failing requesters in the same partition make requests for those cache lines. This will be discussed further below.

It may be noted that requests from I/O modules 111A to MSU 100A may also reside within request input queue 201A of port 1, 200A, when the error flit is received. These requests will be transferred to TTQ 204 in a normal manner, and will be processed by the TTQ as described above.

Finally, it may be noted that in some scenarios, request input queue 201A of port 1 may store requests from I/O modules 111A to another MSU. For example, if memory within MSU 100C were allocated to the same partition as I/O modules 111A, request input queue 201A may store requests from I/O modules 111A to MSU 100C. Requests from I/O modules 111A that are stored within request input queue 201A may be transferred to port 3, 200C and forwarded to MSU 100C.

Recall that if MSU 100C included memory allocated to the affected partition, PND 102A will have generated an error flit to MSU 100C notifying MSU 100C of the current non-fatal fault condition involving I/O modules 111A. Therefore, when a request from I/O modules 111A is received by MSU 100C, this request will be processed in the same manner described above with respect to MSU 100A. That is, read requests will be discarded by MSU 100C. Write requests from I/O modules 111A that were in-progress when PND 102A transferred the error flit are padded with corrupted data and routed to the destination MSU 100C, as discussed above. These requests may be transferred to MSU 100C, with the data being stored to memory in that corrupted state. Other write requests from I/O modules that were completed to MSU 100A before transmission of the error flit may be completed normally. In an alternative embodiment, MSU 100C may simply discard all write requests along with the read requests. Requests to MSU 100D will be handled in a similar manner if that MSU also included memory in the affected partition.

The foregoing discussion describes the handling of requests from a failed unit to an MSU. Requests are also issued in the opposite direction from an MSU to the failed unit. These requests include snoop requests that are initially stored within snoop request out queue 214, and which are then transferred to the appropriate queue of a port for transfer to the target requester. For example, in the current scenario, snoop requests to I/O modules 111A are initially stored in snoop request out queue 214, and are then transferred to snoop request output queue 224A of port 1. Such snoop requests are issued by an MSU to solicit the return of data and/or data access rights that have been retained by I/O modules 111A. After a TTQ receives an error flit from an I/O module, the issuance of snoop requests to the affected I/O module continues much as would otherwise occur if the error had not been detected. In the error case, however, each of the snoop requests to an affected I/O module includes a special "error fence" indicator that is part of the transaction header of the request. This error fence indication will be included with the returned snoop response to inform the TTQ that processing is completed for the original request that prompted issuance of the snoop request as follows.

During normal (non-error) request processing, a snoop request issued to I/O modules 111A is forwarded to those modules via I/O interface 112A. The I/O module will then generate a response that returns the requested data and/or access rights to the MSU. However, because the Present signal in I/O interface 112A is deactivated in the current example, error logic 130A of PND 102A is enabled to generate a snoop response on behalf of I/O modules 111A in the manner described above. This snoop response serves as a surrogate for the response that would normally be returned from the I/O modules themselves. This response, which is directed to the MSU that initiated the snoop request, has a transaction header that includes a transaction type field. This transaction type field is modified by error logic 130A from a snoop request type to a snoop response type. In addition, error logic 130A stores a status of "master abort" into the transaction header. The transaction ID that is included within the transaction header remains the same as that provided with the snoop request, and the error fence indicator remains activated in the snoop response header. In one embodiment, no data is returned with this response, even if the return of data is requested by the snoop request, as is discussed below.

When the MSU receives a snoop response with a status of master abort, the snoop response is matched to the appropriate TTQ entry that stores the original read request that prompted the snoop request. This match is performed using the transaction ID. In a non-error case in which the snoop response returns ownership rights for the requested data, the snoop response will also return the data. In a fault case, however, the data is not returned. Therefore, the state machine for the TTQ entry retrieves the data from data store 103A so that it can be provided to the original requester, so long as the requester is not also associated with a fault. It is assumed that because of the fault, updates for this data have been lost, and the data must therefore be considered corrupted. As such, the state machine causes this data to be corrupted as it is being provided from snoop response out queue 212 to the appropriate MSU port. The data is corrupted by forcing the ECC code accompanying the data to a predetermined state associated with data corruption. In addition, a status indicator is set within the directory entry 101A for this cache line to flag the cache line as corrupted. Finally, the data and ECC code are provided to the appropriate MSU port and are forwarded to this original requester.

When a non-failing requester receives data with a predetermined ECC code that indicates the cache line is corrupted, the requester will recognize that the data cannot be utilized. Recovery logic, which may be included in hardware, software, firmware, any other type of programmed or non-programmed logic, or any combination thereof, will determine whether the corrupted data is considered essential to continued system operations. Such recovery logic is shown as recovery logic 128A for IP 110A of FIG. 1, although it will be understood that other IPs and/or maintenance processor 124 may include such logic. Operation of the recovery logic is discussed further below in reference to FIG. 6.

As stated above, the recovery logic will determine whether the corrupted data is considered essential to continued system operations. This may be accomplished, for example, by determining whether the corrupted information is program code that is needed for continued execution. Other predetermined criteria may be applied to determine whether the corruption must force a system stoppage. If so, the recovery logic will provide a message to maintenance processor 124, which will halt the partition in a manner to be discussed below.

If the recovery logic determines that the corrupted cache line stores non-essential data, non-failing requesters within the partition may continue to execute. The recovery logic may, in this case, determine that the cache line is to be "cleaned". This is accomplished by replacing the corrupted data with data generated by the recovery logic, as is allowed if the current non-failing requester has ownership rights to the data. If the requester has read-only privileges, the data is cleaned by storing it back to the MSU accompanied by the appropriate ECC code based on the ECC scheme being used by the system. This code replaces the ECC code indicating data corruption. This write request will be entered into TTQ 204 and processed in the manner discussed above. The data and appropriate ECC code will be written to data store 103A so that the cache line copy in the MSU is no longer corrupted. This operation will also clear the indication of cache line corruption stored within the associated directory entry of directory 101A.

The description above relates to the processing of a read request for data by a non-failing requester when the requested cache was owned, and therefore considered updated, by a failing requester. Similar processing occurs for a read request by a non-failing requester for a cache line that has been granted in a shared state to a failed requester. If such a read request from a non-failing requester is pending within TTQ 204 when the error flit is received, a snoop request will be generated for the failed requester by the state machine associated with the original request. In the manner discussed above, this snoop request will include an error fence indicator in the request header. The snoop request will be handled by error logic 130A in the foregoing manner so that a snoop response is returned to the MSU.

When the error fence snoop response is received, the MSU will provide data retrieved from data store 103A to the non-failing requester to satisfy the request. Because the I/O modules 111A retained a copy of this data in a read-only state, this data is not considered updated by I/O modules 111A, and is therefore not corrupted. Processing by a non-failing requester can continue for this cache line in a normal manner.

Finally, it may be noted that the above-described examples assume that the original read request that prompted the snoop request was issued by a non-failing requester. If this is not the case, processing occurs in the manner described above, with the data being flagged as corrupted using an indicator stored in directory 101A. In this case, however, the data is not returned to the requester that initiated the original read request, and the MSU maintains ownership of the data. This type of situation could occur, for example, if multiple errors are occurring within the system at the same time.

The foregoing paragraphs describe the generation by a TTQ of snoop requests to a failed unit after reception of an error flit. It may be noted that some snoop requests without the error fence attribute may be stored within snoop request output queue 224A at the time the error flit is received. These requests will be issued via MI 109A and processed by error logic 130A in the manner discussed above. The snoop responses generated by error logic 130A will include a status of "master abort", and will return access rights to the MSU as discussed above. These snoop responses will be processed by TTQ in the manner previously described.

The above discussion describes the processing of snoop requests to a failed requester that are queued within snoop request out queue 214 or within a queue of a port of an MSU when an error flit is received by the MSU. In another scenario, some snoop requests may have been issued to a failing requester and are awaiting snoop responses when the error flit is received. In this case, the issuing MSU cannot be sure that a response to the snoop request will ever be received. Therefore, special processing is initiated for these requests. Specifically, when any of the state machines 207 of TTQ 204 is in a state that indicates that a pending snoop request has been issued to a failed requester, the state machine generates another snoop request to the same failed requester. This snoop request has the special error fence indicator set in the transaction header. According to the current example, this snoop request will be provided by MSU 100A to PND 102A.

Upon receipt of the snoop request, error logic 130A will generate a snoop response with the error fence indicator set. In the manner discussed above, the response will include the same transaction ID as the request, will have a transaction type of "snoop response", will contain an activated error fence indicator, and will include a status of "master abort".

While processing of the above-described error fence snoop request is underway, MSU 100A may receive a snoop response from PND 102A that was generated as a result of the original snoop request that was pending at the time the error flit was received. This may occur, for example, if I/O modules 111A provided the snoop response to PND 102A before the Present signal on I/O interface 112A was deactivated. This may also occur if error logic 130A of PND 102A generated a snoop response having a status of "master abort" after deactivation of the Present signal while processing snoop requests destined for the failed unit. This snoop response will be matched with an entry in TTQ 204 using the transaction ID included with this response. The associated state machine will detect that this snoop response was obtained because of a snoop request that was pending at the time the error flit was received, and that was followed by a subsequently-issued error fence snoop request. The state machine will therefore ignore this snoop response, and will instead wait for a snoop response with the same transaction ID, but that includes an activated error fence indicator.

It may be noted that while MSU 100A may receive a snoop response from PND 102A in response to a snoop request that is pending at the time of the error occurrence in the manner discussed above, such a response is not guaranteed, as mentioned above. For example, the Present signal of I/O interface may be deactivated after the original snoop request is issued to I/O modules 111A by PND 102A but before the I/O modules could return a snoop response to PND 102A. In this case, the snoop response will never be returned as a result of the original snoop request, and the issuance of the error fence snoop request is therefore required to ensure any snoop response will be received. Without the issuance of the error fence snoop request, the original read request that prompted issuance of the snoop transaction will never be processed to completion.

When MSU 100A receives the error fence snoop response that includes a master abort status and the activated error fence indicator, the response will be matched to one of the entries in TTQ 204 using the transaction ID. The state machine associated with this TTQ entry will detect the master abort status and the error fence indication, and will therefore determine that no further responses are expected for the snoop request. As noted above, if the error fence snoop request were not issued, the MSU could wait indefinitely for return of a snoop response that may never be returned because the target of the snoop request has failed and the associated interface has been disabled. Because the PND logic enforces a requirement whereby responses from a particular requester are returned to an MSU in the same time order as the corresponding requests were received, receipt of an error fence response by an MSU indicates that no further snoop responses should be expected in response to a particular snoop request. Therefore, processing of a TTQ entry may continue.

As discussed above, one of state machines 207 within TTQ 204 will process an error fence snoop response in a manner that is dictated by the type of response. If the snoop response is returning ownership of a cache line, a status indicator is stored to directory 101A for this cache line to record that this data is considered unusable. Then, if a non-failing requester issued the original request that necessitated the snoop request, the state machine processing this request causes this data to be corrupted as it is being provided from snoop response out queue 212 to the appropriate MSU port by forcing the ECC code to a predetermined corruption state. The data and the ECC code are provided to the non-failing requester, which may then perform recovery operations on the cache line as previously described so that uncorrected data is eventually returned to the MSU. If the snoop response is instead returning access rights only, uncorrupted data may be returned to the non-failing requester, and processing can continue in a normal fashion.

Finally, it may be noted that in one embodiment, all snoop requests, including those that were pending to a failing requester at the time the error flit is received, as well as those that are issued afterwards, include an activated error fence indicator. This provides consistency, since TTQ 204 can utilize the error fence indicator of a snoop response to recognize that the particular snoop response completes the transaction. In another embodiment, this indicator is not needed for those snoop responses that are issued after the error flit is received.

Finally, one additional type of response that may be stored within the MSU when the error flit is received involves a retry operation. Recall that if the TTQ usage level exceeds a certain programmable threshold, some requests that are stored within the TTQ may be handled by causing them to be retried. During normal operation, this occurs by issuing a retry response to the original requester. After the retry response is issued in this manner, the original request can be removed from the TTQ, freeing up resources for other requests. Sometime latter, the PND that receives a retry response is then responsible for re-issuing the original request to the MSU.

In some cases, a retry response of the type discussed above may be stored within response output queue 222A awaiting transmission to PND 102A when an error flit is received from that requester. Assume, for example, that such a response involves an original request from one of I/O modules 111A. In this case, the retry response will be issued to PND 102A as though no fault occurred. After issuance of the retry response, the associated TTQ state machine will remove the request that prompted this response from the TTQ entry. When the PND receives this response, the PND will recognize it as being associated with a failed requester and will discard it.

After all types of requests from the failing units that are stored within the TTQ have been processed as described above, the non-failing units within the same partition as I/O modules 111A may continue executing. This will cause the issuance of additional requests to the MSUs. Some of these requests may be requesting access to cache lines that are still either owned, or shared, by I/O modules 111A. These requests will be handled in a manner that is similar to way in which the requests that were pending at the time of the failure were processed. That is, an appropriate snoop request is issued to the failing unit. In this case, the snoop request is not an error fence request, and the error fence indicator need not be activated. These requests are turned around as responses by error logic 130A within the PND, and are returned to MSU 100A.

Snoop responses returned to the MSU 100A on behalf of the failing requester are handled by the MSU in the manner discussed above. Specifically, if the snoop request solicited the return of data owned by I/O modules 111A, return of the snoop response causes data to be marked as corrupted within directory 101A. Corrupted cache line data may then be returned to a non-failing requester and recovered under the control of recovery logic associated with the requester. According to another scenario, if the snoop response is associated with data shared by I/O modules, non-corrupted data retrieved from data store 103A will be returned to the non-failing requester, the directory entry for the cache line will be updated to reflect that I/O modules 111A no longer store a read-only copy, and processing may continue according to a normal scenario.

The current example primarily describes recovery actions occurring within MSU 100A as the result of a non-fatal fault. It will be understood, however, that similar recovery steps are initiated by MSU 100B for requests and responses from I/O modules 111A that are issued to MSU 100B, and vice versa. Moreover, any MSU that includes memory allocated to the same partition as a failing I/O module will undergo the type of recovery scenarios described above with respect to MSU 100A. For example, if MSU 100C had included memory allocated to the same partition as I/O modules 111A, a TTQ within this MSU would initiate the same type of recovery actions described above. This includes the issuance of error fence snoop requests to I/O modules 111A, and the return of error fence snoop responses generated by error logic 130A.

In an alternative scenario such as described above, snoop requests issued by MSU 100C to I/O modules 111A are initially stored by MSU 100C to a request output queue of MSU 100C port 4. These snoop requests are then provided to request input queue 244 of MSU 100A via the MSU-to-MSU interface. These requests are forwarded to snoop request output queue 224A of MSU 100A port 1. Snoop responses generated by error logic 130A are returned to snoop response input queue 226A of MSU 100A port 1. From there, the responses are transferred to response output queue 246 of MSU 100A port 3, and returned via MSU-to-MSU interface 304 to MSU 100C. Such snoop responses are processed within MSU 100C in the manner described above so that access rights, and, in some cases, data, may be provided to non-failing requesters.

The above-described mechanism allows snoop requests to failed requesters to be handled much as those requests to other non-failing requesters. This minimizes the need for specialized error handling logic. Moreover, this provides a way to remove from TTQ 204 all residue resulting from activity of the failing requesters so that non-failing units may continue operating unaffected.

Figure 4A:
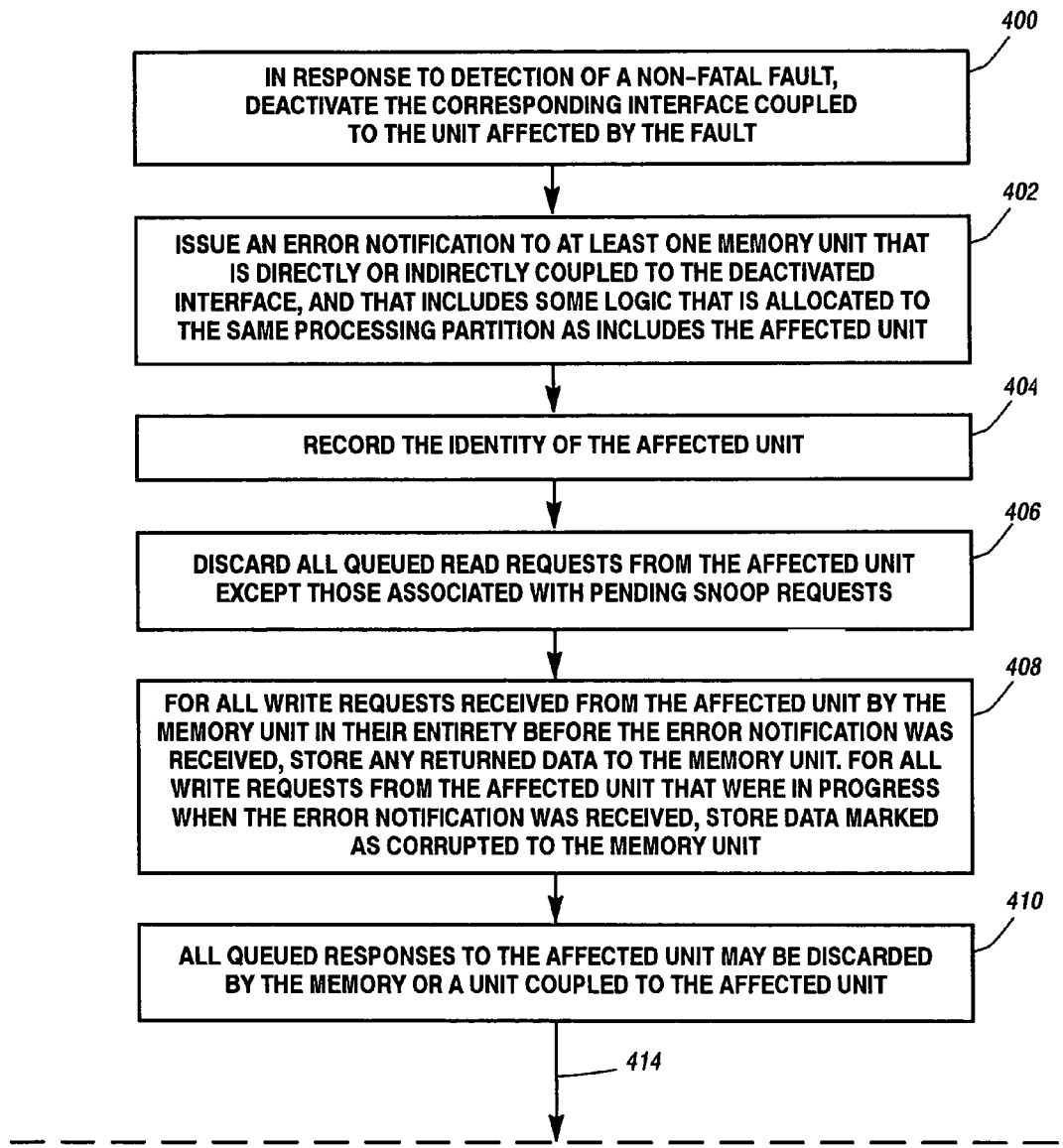
FIGS. 4A and 4B, when arranged as shown in FIG. 4, are a flow diagram summarizing the recovery steps that are taken according to the current invention when a non-fatal fault is detected.
Figure 4B:
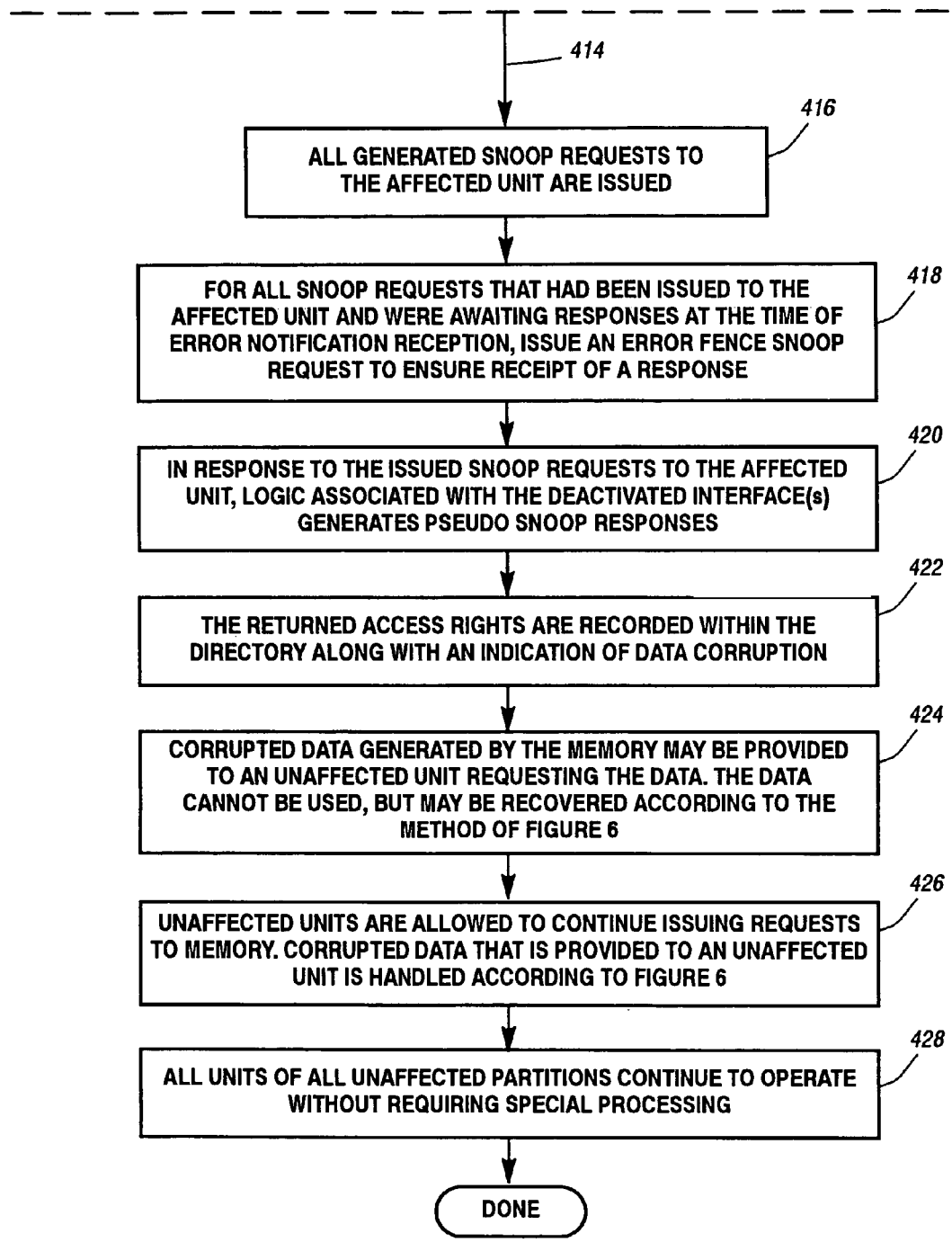

FIGS. 4A and 4B, when arranged as shown in FIG. 4, are a flow diagram summarizing the recovery steps that are taken in response to the detection of a non-fatal fault in a unit or an interface coupled to the unit. First, the affected interface is deactivated (400). In one embodiment, this involves driving a Present signal to an inactive state. Thereafter, an error notification is issued to at least one memory unit that is coupled, either directly or indirectly, to the deactivated interface, and that includes memory allocated to the same partition as the failing requester (402). In the current embodiment, the error notification is an error flit that has a format that is consistent with any other transaction type, and that can be transferred and processed via the same logic that is used to process other (non-error) transactions. This eliminates the need to provide a specialized interface to support recovery actions, and minimizes other error logic that is required within the system.

Within a memory unit that originally received the error flit, the identity of the unit affected by the fault is recorded (404). As discussed above, this unit may be failing, or it may instead be coupled to an interface that is failing. In one embodiment, the identity of the affected unit is recorded within FRR 240.

Next, the TTQ begins processing stored transactions from, or associated with, the affected unit. In particular, all queued read requests from the affected unit, except those involving pending snoop responses, may be discarded by the TTQ (406). All write requests that were received from the affected unit by the memory in their entirety before the error notification was received may be completed normally. All write requests that were in-progress to the memory when the memory received the error notification are completed by storing corrupted data to memory (408). In one embodiment, this involves storing a predetermined ECC code to memory with the data. All responses to the affected unit may be discarded, either by the TTQ or by the PND 102A after the MSU issues the response to the PND (410). Thus, in one embodiment, responses within response out queue 212 will be discarded by TTQ 204, whereas those responses already queued within response output queue 222A of port 1 are issued to processor nodes 120A to be discarded by PND 102A.

Processing next continues to FIG. 4B, as indicated by arrow 414. All snoop requests to the affected unit are issued (416). This includes those generated prior to receipt of the error notification and queued within snoop request output queue 224A, as well as those generated thereafter. In one embodiment, snoop requests generated by TTQ after receipt of the error notification include a special error fence indicator. This error fence indicator will be returned with the corresponding response and used by the memory to determine that the transaction has been completed. Additionally, for all snoop requests that had been issued to the failed requester and that were awaiting responses at the time the error notification was received by the memory unit, a special error fence snoop request is issued that ensures a response will be received for these requests (418). If this type of request were not issued, the originally-issued snoop request may never receive a response, since the requester may have failed during the generation of the associated response.

When a processing node receives a snoop request for an affected unit, that request is not provided to the affected unit. Instead error logic associated with the deactivated interface receives these snoop requests and generates snoop responses that include the error response indicator (420). When these snoop responses are returned to the memory, and if the snoop response returns ownership, the data associated with the response is flagged as corrupted within the directory (422). Additionally, this data may be returned in a corrupted state to the unit that issued the request prompting the snoop request (424). Because the data is corrupted, it cannot be used, but may be recovered according to the method of FIG. 6, discussed below.

The non-failing units within the affected partition are allowed to continue making requests to the memory units without being affected by the non-fatal fault (426). Any requests that are directed to data that was retained by an affected unit will result in snoop requests that return corrupted data in the manner discussed above. This data is provided to the unaffected unit, and can be recovered according to the method of FIG. 6. All units included within partitions that do not include the affected unit continue to operate without being affected by the fault (428). It may be noted that at any time during the method depicted in FIG. 4, the affected unit may be halted by the maintenance processor so that diagnostic and recovery operations may be performed.

The above-described mechanism discusses a failure associated with one or more I/O modules or an I/O interface. Such failures are considered non-fatal. As such, other I/O modules and IPs within the same partition as the failing requester may continue to issue requests to MSUs in the partition. These units are not halted. For example, in the scenario discussed above wherein I/O modules 111A are failing, IPs within processor nodes 120A and 120D, as well as I/O modules 111D, continue to issue requests to memory ranges 300 and 302 of MSUs 100A and 100B. Processing is allowed to continue during, and after, recovery operations because it is assumed that significant portions of essential data shared between requesters will not generally be lost should a group of I/O modules fail. This is not considered to be the case, however, if a failure occurs on a processor bus such as processor bus 104A. In this case, it is considered likely that a processor cache such as SLC 108A, shared cache 106A, or a processor first-level cache of an IP will store code and data that, if lost, will result in critical errors. For this reason, an error detected on a processor bus or a unit coupled to this bus will be handled in a manner that causes all units within the partition to halt. Units in other partitions will continue to execute in an unaffected manner, as follows.

Consider a case wherein logic within BC 114A is failing and PND 102A detects the fault. This could occur, for example, because PND detects a parity or protocol error, or determines that one of the critical signals on processor bus 104A has been driven to a state that indicates a problem has occurred. In either case, error logic 130A will cause the Present signal on MI 109A and MI 109C to be deactivated, thereby isolating processor node 120A from the remainder of the system. The PND will then discontinue processing requests from IPs 110A-110D and I/O modules 111A, and will wait to be reset by maintenance processor 124.

Within MSU 100A, error logic 250A will detect the deactivation of the Present signal on MI. An indication of this deactivation will be provided to central error logic 260. Because this error is associated with an MI instead of an I/O interface, the fault is considered fatal. Therefore, a state machine within central error logic 260 will cause the error logic for each of the ports associated with the affected partition to take certain actions to isolate MSU 100A from the rest of the system. In particular, error logic 250A will become configured to intercept any request that requires a response from port 1, 200A. Error logic will then generate a surrogate response for the request in much the same way error logic 130A of processor node 120A generates snoop responses. This will be discussed further below. Error logic will also configure itself to ignore certain flow control signals from processor node 120A that are included in MI 109A. These flow control signals inform MSU 100A to temporarily discontinue sending requests or responses to processor node 120A until queue resources become available. These flow control signals will be ignored by error logic 250A, which may issue transactions onto the disabled MI 109A during error recovery operations as a simple way to discard these transactions and place the MSU in a known state. This will be discussed below.

Error logic 250C of port 200C undergoes similar types of operations as those discussed above with respect to port 200A. In particular, upon receiving an indication of the fatal fault from central error logic 260, error logic 250C will deactivate the Present signal on MSU-to-MSU interface 304. Error logic 250C will then configure itself to intercept those requests that require responses so that responses can be generated and returned to the TTQ 204, as will be discussed below. Any flow control signals on the MSU-to-MSU interface 304 will be ignored so that other types of transactions can be discarded on the interface without regard to the state of the flow control signals.

Next, central error logic 260 will begin generating error flits for each unit that is included within the same partition as processor node 120A, as determined by partition registers 265. These error flits are issued to the error logic of the port associated with the unit. For example, central error logic 260 will generate error flits for I/O modules 111A and PND 102A. These error flits will be issued to port 1, 200A, which is interconnected to these units. Similarly, error flits will be generated for the PND of processor node 120D, as well as for I/O modules 111D. These error flits will be issued to port 3, 200C, which is indirectly coupled to these units.

When error logic 250A receives the error flits for I/O modules 111A and PND 102A, the error flit forwards these flits to TTQ 204. When central error logic 260 detects the flits within the TTQ, this error logic will use a field within the flit that identifies the failing unit to set the FRR 240. In this manner, the same procedure used by central error logic to set the FRR 240 in the case of non-fatal errors is also used to process the fatal error flits. A similar operation occurs within port 3, which will receive error flits for processor node 120D and I/O modules 111D.

As noted above, when error logic 250C received an indication of the fatal fault from central error logic 260, error logic 250C caused the Present signal on MSU-to-MSU interface to become deactivated. This is detected by port 4, 200M, of MSU 100C, which signals its central error logic of the failure. In turn, central error logic will perform similar actions as that described above with respect to MSU 100A. It will signal each port associated with the partition to deactivate its Present signal. In the current example, MSU 100C will signal port 2, 200K, to deactivate the Present signal on MI 109F. MSU 100C then begins issuing error flits to its ports 2 and 4. For port 2, for example, error flits are issued for processor node 120D and I/O modules 111D, and for port 4, error flits are issued for processor node 120A and I/O modules 111A. The error flits are received by the ports, forwarded to the TTQ of MSU 100C, and ultimately result in the creation of a record of the failed units within the FRR of MSU 100C.

It should be noted that in a larger configuration, if port 3 of MSU 100C were coupled to still another MSU included within the affected partition, operation of central error logic of MSU 100C would cause deactivation of the Present signal on the associated MSU-to-MSU interface, thereby alerting this other MSU of the failure. In the foregoing manner, a "chain reaction" is created, whereby every MSU-to-MSU interface and MI in the partition is deactivated.

Returning again to a discussion of MSU 100A, after the error flits cause a creation of a record of failed units within FRR 240, TTQ will continue processing requests. All requests and responses from, or to, units identified in FRR will be handled according to the following error recovery procedures. All read requests from the affected units that are already stored within TTQ and storage queue 210 may be discarded, unless those requests are associated with a pending snoop request. Any requests associated with pending snoop request must remain in TTQ until the snoop responses are received. It may be noted that request input queue 201A of port 1 and request input queue 244 of port 3 may store read requests from affected units. These requests are allowed to enter TTQ 204 and are processed in a similar manner as described above with respect to those requests that were stored within TTQ 204 when recovery operations were initiated.

TTQ 204 may also store write requests from failing requesters. Those write requests that were received by request input queue 201A in their entirety prior to reception of the error flit may be completed normally. Write requests from failing requesters that were being received by MSU 100A when the error flit was received are processed so that corrupted data is stored in data store 103A. Any write requests stored within request input queue 201A of port 1 and request input queue 244 of port 3 are allowed to enter TTQ to be processed in this manner. In an alternative embodiment, any write requests from failing requesters may simply be discarded along with read requests. This will not mark the cache lines as corrupted in data store 103A, however. These cache lines may be flagged as corrupted later if a read request that is stored within TTQ at the time the error flit is received is requesting access to this data, thereby necessitating the issuance of a error fence snoop request for this data.

Responses stored within the queues, or generated during recovery operations, can be handled in one of two ways. The responses may be merely discarded by the TTQ. For example, assume a read request from a failing requester was in-progress to data store 103A at the time recovery operations were initiated. When the response from data store 103A is provided to TTQ 204 for this request, that response can be discarded by not storing it to response out queue 212. In other cases, responses such as those that are already queued within response output queue 222A at the time error recovery is initiated are simply discarded by issuing those responses to MI 109A. This interface is deactivated, and the response will therefore be ignored by the target requester, clearing the response output queue 222A.

In some scenarios, requests and responses may be stored within the queues of the ports of MSU 100A that are not directed to memory within MSU 100A. For example, if memory within MSU 100C were allocated to the affected partition, requests from I/O modules 111A and processor node 120A may address memory within MSU 100C. These requests may be stored within request input queue 201 of port 1. These request may be simply handled as they would be during normal transaction processing. That is, they may be transferred to port 3, 200C, of MSU 100A and issued to deactivated MSU-to-MSU interface 304, thereby effectively discarding these requests.

Responses from another MSU such as MSU 100C may be handled in a manner similar to that described above. They may be received within response input queued 248 of port 3, and transferred to response output queue 222A of port 1. From there, they may be discarded by transferring them onto deactivated MI interface 109A. This allows request and response processing for these types of transactions to be handled without special recovery procedures.

Next, snoop transactions are considered. As discussed above, requests may be stored within snoop request output queue 224A when recovery operations are initiated. Similarly, snoop requests may be stored within snoop request out queue 214 awaiting transfer to snoop request output queue 224A. These requests will be processed by error logic 250A to generate surrogate snoop responses in much the same way snoop responses were generated by error logic 130A. In particular, error logic 250A updates the transaction type field from "snoop request" to "snoop response". The transaction ID field is left unchanged, and a status of "master abort" is entered into the status field. The source and destination fields are swapped so that the snoop response appears to have been generated by a failing requester. Error logic 250A stores these snoop responses within snoop response input queue 226A.

TTQ 204 receives snoop responses from failing requesters from snoop response input queue 226A, and processes these snoop responses in a manner that is substantially the way any other snoop response would be processed. That is, any returned access rights and data are stored to directory 101A. If the snoop response returned ownership, a status indication is stored within directory 101A to flag the data as corrupted. The original read request that prompted the snoop request will then be removed from TTQ 204. The data will not be returned to a requester, since all requesters in the partition are undergoing recovery operations.

In a manner similar to that described above, if a state machine determines that a snoop request was already issued via MI 109A and was pending to one of requesters associated with processor node 120A or I/O modules 111A at the time Present signal 266 was deactivated, TTQ 204 generates an error fence snoop request to the same requester to ensure that a snoop response is provided for the request. This error fence snoop request will be stored within snoop request output queue 224A. Error logic 250A will use this request to generate an error fence snoop response that is entered into snoop response input queue 226A, and processed by TTQ 204 in the manner discussed in the foregoing paragraph. If, in the interim, another snoop response is received by TTQ 204 for an entry associated with an error fence snoop request, as may occur if that snoop response was received from MI into snoop response input queue 226 just before the MI was deactivated, the interim snoop response is ignored. TTQ waits for return of the error fence snoop response to complete processing of the original read request so that the TTQ entry may be cleared.

The type of request processing performed for the snoop requests of port 1 are also performed for any snoop requests to processor node 120D or I/O modules 111D that are stored in request output queue 242 at the time MSU-to-MSU interface 304 is disabled. Such requests are turned around into responses by error logic 250C so that snoop responses can be provided to TTQ 204, thereby allowing the original read requests that initiated those the snoop requests to be processed to completion.

In the manner described above, all requests that are associated with the failing partition that are stored within TTQ 204, storage queue 210, and snoop request out queue 214 of MSU 100A are processed to completion. Similarly, all responses to, or from, the requesters of this partition, including responses stored within response out queue 212, are processed to completion. All queues within port 1 200A and port 3, 200C are emptied. Because the TTQ 204 and all queues shared between partitions, including storage queue 210, response out queue 212, and snoop request out queue 214, are cleared of residue from the failing partition, requests from requesters within a non-failing partition may continue to be processed in a normal, unaffected manner. Such requests from the non-failing partition will be received from ports 2 and 4 of MSU 100A in the current example.

Similar operations as those described above with respect to MSU 100A occur within MSU 100B. Additionally, a sub-set of these operations will occur within MSUs 100C and 100D. The central error logic of MSUs 100C and 100D will cause the deactivation of the affected MIs 109F and 109H, respectively. This central error logic will thereafter generate error flits so the FRRs of both MSUs 100C and 100D are set to record the failures. The error logic will also condition the port logic of its MSU to ignore the flow control signals from the MSU-to-MSU and MI interfaces.

After the central error logic conditions the port logic in the above-described manner, the error logic within each of the affected ports will process the various stored requests and responses. In particular, all read and write requests stored within ports 2 of MSUs 100C and 100D are transferred to their respective port 4, as would normally be the case. These requests, which by definition of the partition address memory within either MSU 100A or 100B, may be discarded by issuing them to the respective MSU-to-MSU interfaces, which have been disabled.

In a similar manner, any responses from MSUs 100A or 100B to I/O modules 111D or processor node 120D that have been stored within ports 4 of MSUs 100C or 100D, respectively, may be transferred to their respective ports 2. These responses may be discarded by issuing them to the disable MI interfaces 109F and 109H, respectively.

It may be noted that the request input queues of ports 4 of MSUs 100C or 100D may also store snoop requests to I/O modules 111D and processor node 120D. These snoop requests may be transferred to their respective ports 2 and issued to the MI interfaces so that they are discarded. Likewise, any snoop responses from I/O modules 111D or processor node 120D that are stored within ports 2 of MSUs 100C or 100D at the time the interfaces are disabled may be simply transferred to the respective ports 4 and discarded by issuing them to the MSU-to-MSU interfaces.

It may further be noted that no processing of requests is required by the TTQs of MSUs 100C and 100D during error recovery operations of the current scenario. This is because no memory within these MSUs is allocated to the affected partition, and therefore no requests or responses from affected units will be destined for these TTQs. If memory within these MSUs had been included within the failing partition such that requests from, or responses to, the failed units were stored within these queues, recovery operations would proceed as discussed above with regards to MSU 100A.

After the recovery actions described above are completed, all requests and responses associated with the failing partition have been processed so that the logic is in a known state. Logic that is shared between the failing partition and another partition, such as the TTQs 204 of MSUs 100A and 100B and other shared resources, have been recovered so that all residue, including outstanding requests and responses, have been removed.

In one embodiment of the invention, each of the MSUs includes a recovery completion state device. When the MSU has completed recovery operations in the manner described above, the MSU sets this state device to indicate that all MSU logic allocated to the affected partition is now in a known idle state. Maintenance processor polls these state devices via scan interface 126 to determine when all MSUs that include logic allocated to a failing partition have completed recovery actions. Thereafter, the maintenance processor may initiate diagnostic activities and, if desired, begin additional recovery operations. In an alternative embodiment, the maintenance processor may wait a predetermined time period after receiving the first error report involving the affected partition before initiating diagnostic activities. The predetermined period is selected as some time that is known to be adequate for allowing completion of MSU recovery operations.

The error scenario described above involves a failure in BC 114A on processor bus 104A. Similar actions are taken for errors detected on any of the other processor buses in any of the other processor nodes, for any other failure within the processor node, or for a detected failure on an MI itself. The MIs that are most directly associated with the failure will be deactivated. This will be detected by error logic within the intercoupled MSUs, starting a "chain reaction" that will deactivate every MI, MSU-to-MSU interface, and I/O interface in the affected partition.

All of the above examples discuss errors that occur within logic that is dedicated to a particular partition. In another scenario, logic of an MSU that is shared between two partitions may fail. This may involve a failure within data store 103A, directory 101A, TTQ 204, or state calculation logic 220. In this case, both of the partitions associated with the failing MSU are halted. For example, assume that parity errors are detected on data stored within the storage queue 210 of MSU 100A. As a result, TTQ notifies central error logic 260, which then takes the actions described above with respect to the fatal error case. That is, central error logic notifies the error logic within all ports of the MSU. This error logic deactivates the associated interface, which may be an MI or an MSU-to-MSU interface. The error logic then is conditioned to ignore flow control on that interface, and to turn around the various requests that may be stored to the ports and which request responses. This includes error flits and snoop requests, as discussed above. Thereafter, the TTQ of each affected MSU will process requests and responses from, and to, all affected units of both partitions in the manner described above. This type of processing activity will occur in all MSUs associated with both affected partitions to place the logic in a known state so that maintenance processor 124 can initiate diagnostic operations.

It may be noted that when shared logic of a MSU fails, processing is discontinued for all logic associated with the partitions supported by that MSU. In the current scenario, both existing partitions of FIG. 3 will be affected. In a larger configuration that includes more than two partitions, however, those partitions that are not supported by logic within the failing MSU will be allowed to continue execution without being affected by the fault.

Figures 5, 5A:
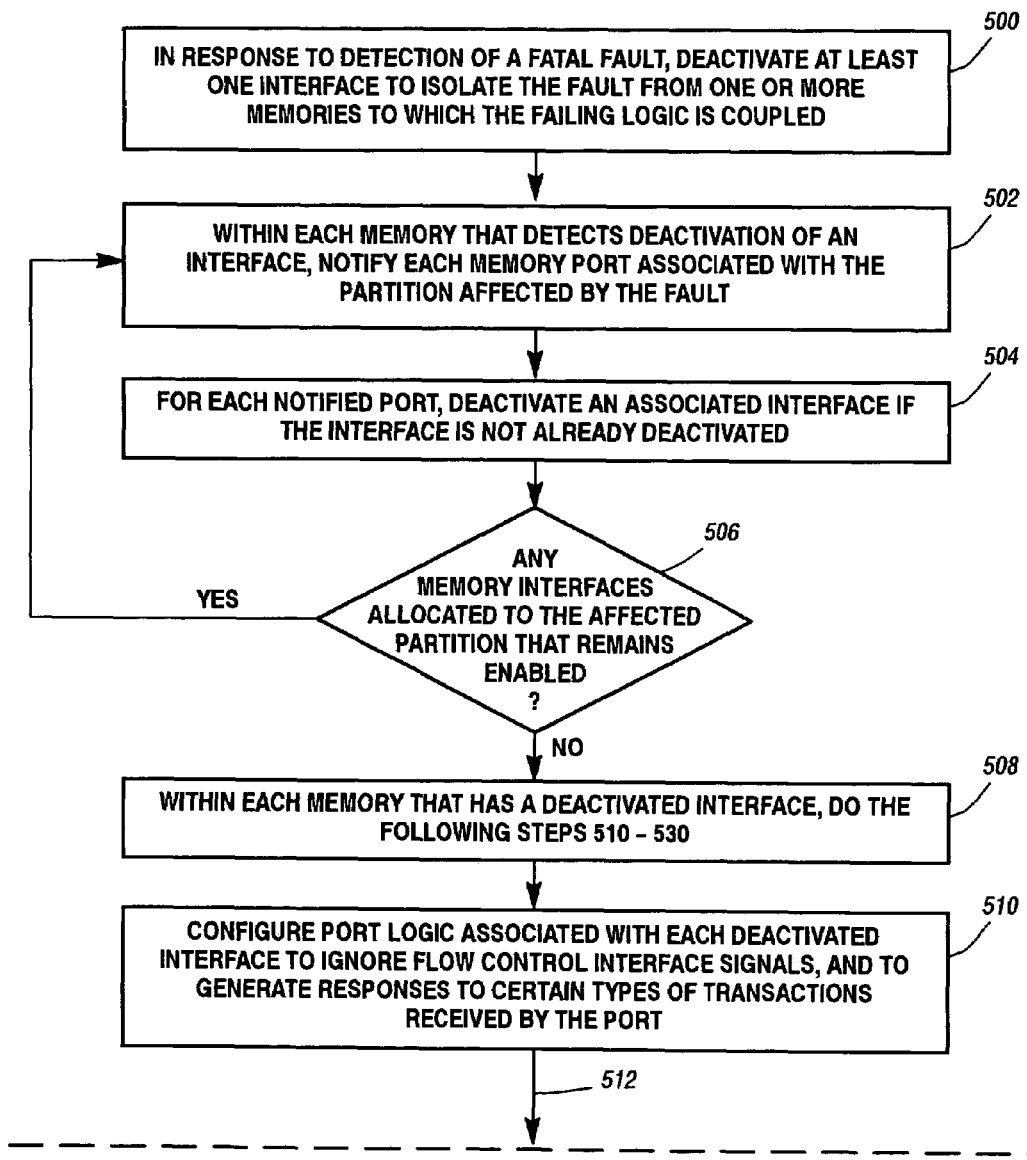
FIGS. 5A, 5B and 5C, when arranged as shown in FIG. 5, are a flow diagram describing the recovery actions taken according to the current invention when a fatal fault is detected.
Figure 5B:
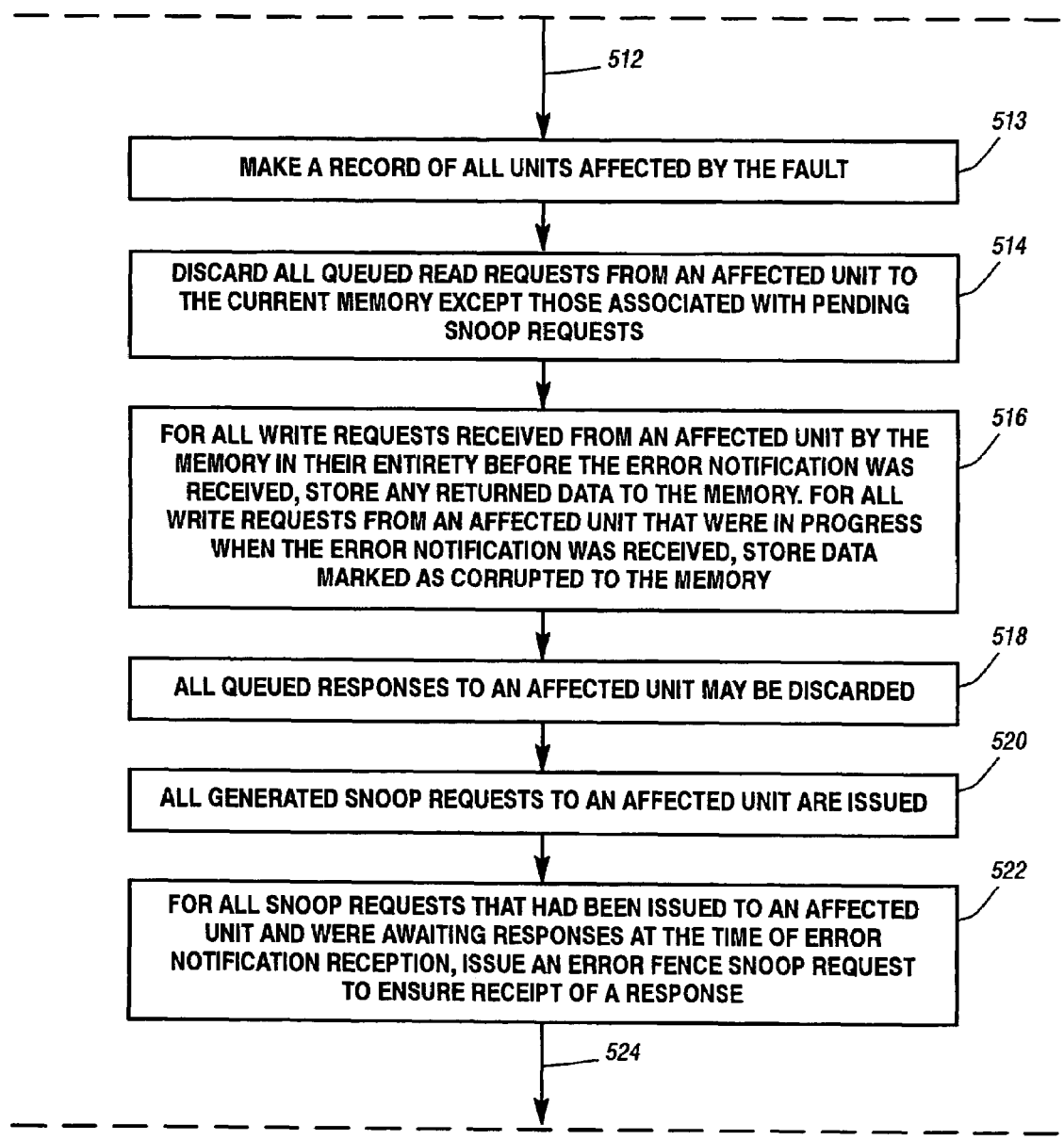
Figure 5C:
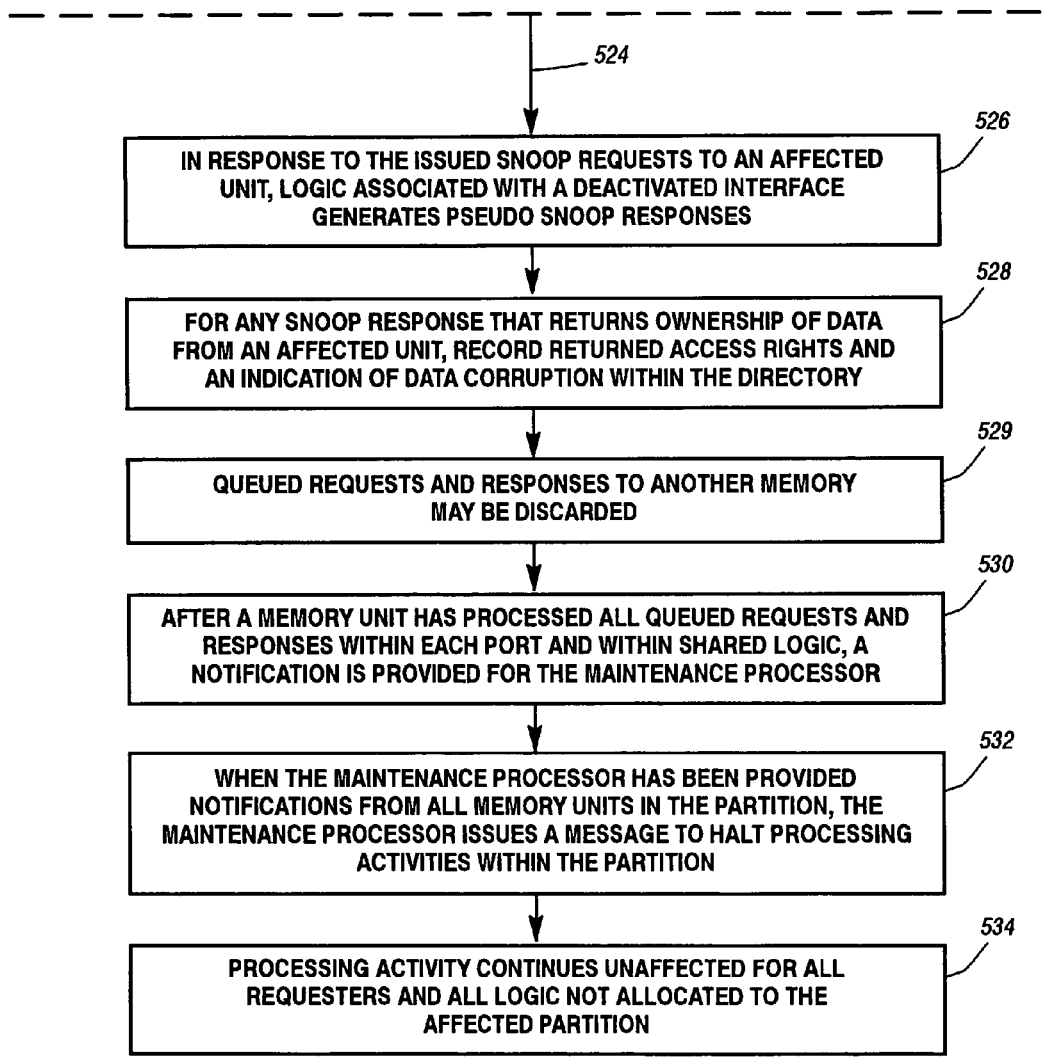

FIGS. 5A, 5B, and 5C when arranged as shown in FIG. 5, are a flow diagram describing the recovery actions taken when a fatal fault is detected. In response to detection of a fatal fault, at least one interface is deactivated to isolate the fault from a memory to which the failing logic is coupled (500). In the current embodiment, this involves deactivating the Present signal on any MI 109 that is directly coupled to a failing processor node 120.

Next, within each memory that detects deactivation of an interface, each memory port associated with the affected partition is notified of the fault (502). In the foregoing embodiment, this task is performed by central error logic 260, which determines which ports to notify using partition registers 264. These ports then deactivate the associated interface if it is not already deactivated (504). As described above, in the current system, this may involve deactivating an MSU-to-MSU interface or an MI. If any interfaces allocated to the affected partition remain active, the process is repeated in a "chain reaction" that spreads from MSU to MSU within the partition, deactivating all such interfaces in the partition (506). Eventually, all I/O, MI, and MSU-to-MSU interfaces in the partition will be deactivated.

After interfaces for a particular memory have been deactivated, recovery operations are performed for that memory (508), as indicated by steps 510-530. First, port logic associated with each deactivated interface is configured to ignore flow control interface signals, and further to generate responses to certain types of transactions (510). In the current embodiment, such transactions include snoop requests and error flits. Processing continues to FIG. 5B, as indicated by arrow 512.

Next, a record is made of all units affected by the fault (513). This is accomplished by the central error logic 260 issuing error flits to the error logic of the ports for each I/O module and PND in the affected partition, as indicated by partition registers 264. These error flits will be provided by the error logic of the ports to TTQ 204, and will then be used by central error logic to set the appropriate bits in FRR 240. This allows central error logic to utilize the same procedure to set FRR for both fatal and non-fatal faults. In another embodiment, central error logic could appropriately configure FRR and notify TTQ of the fault using a different mechanism.

After a record within the FRR is generated, all queued read requests from an affected unit to the memory may be discarded, except for those associated with pending snoop requests (514). Recall that in the case of a fatal fault, all I/O modules and PNDs within the partition are considered to be affected by the fault, as recorded in the FRR. Therefore, all read requests from these units will be discarded in this manner. All write requests from affected units that are received in entirety before reception of the error notification may be completed normally. All write requests that were being transferred to the memory at the time of error notification are completed by storing corrupted data to memory (516). All queued responses to an affected unit may be discarded, either by the memory itself, or by providing the responses to a deactivated interface.

Snoop transactions must also be processed. All generated snoop requests to an affected unit are issued (520), and will be used to generate responses by error logic of the ports, as discussed below. For all snoop requests that had been issued to an affected unit and were awaiting responses at the time of error notification, an error fence snoop request is issued (522). Processing then continues to FIG. 5C, is indicated by arrow 524.

Next, in response to the issued snoop requests to an affected unit, port logic associated with the deactivated interfaces generates surrogate snoop responses (526). If the responses return ownership to data, the data is flagged as corrupted within the memory (528). Any queues requests or responses from an affected unit to another memory in the affected partition may be discarded (529). Recall that such requests and responses to another memory such as memory 100C may be stored within the various queues of the ports. Such transactions may be discarded by issuing them to a deactivated interface.

In one embodiment, after a memory has processed all requests and responses from, and to, units in the affected partition, the memory logic provides some notification for the maintenance processor (530). This may involve activating one or more state devices indicating affected logic is now in a known idle state. The maintenance processor may utilize a scan interface to poll the state device(s) to determine when further diagnostics may be initiated. In another embodiment, the memory logic may issue a message to notify the maintenance processor. The maintenance processor then issues messages to halt processing within all processing nodes and I/O modules (532). Thereafter, the maintenance processor initiates activities to diagnose the fault, and possibly isolate the problem to an I/O module, PND, MSU, or an interface. During this time, processing may continue unaffected in any of one or more processing partitions that are included within the system and that do not include any logic affected by the fault (534).

Figure 6:
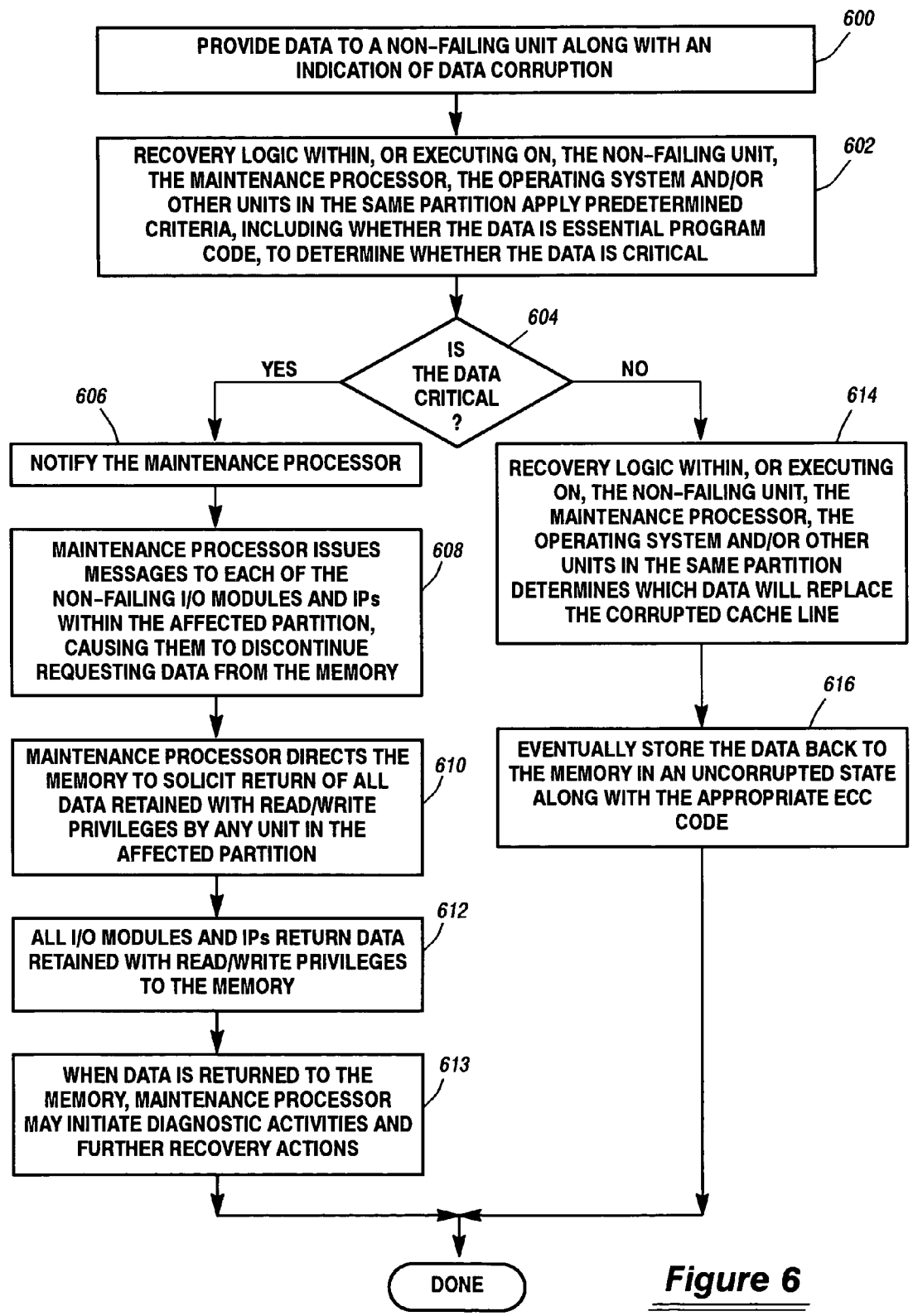
FIG. 6 is a flow diagram illustrating a method of recovering corrupted memory data following a non-fatal fault.

FIG. 6 is a diagram illustrating recovery operations that may be performed to recover memory data that has been corrupted after a non-fatal fault has occurred within a partition. Recall that in one embodiment, this occurs after a snoop response returns ownership from a failing unit so that the associated data is flagged as corrupted within the MSU. In addition, corrupted data is provided to a non-failing unit that issued the memory request that prompted the snoop request (600). Recovery logic within the non-failing unit detects that the data is corrupted, as may occur because of an ECC code provided with the data.

Next, recovery logic associated with the non-failing unit, the operating system, and/or the maintenance processor applies predetermined criteria to determine whether the data is critical (602). The recovery logic used to make this determination may include hardware, firmware, software, or any other type of programmed code. According to one example, the non-failing unit may determine whether the corrupted data comprises programmed code that is essential to continued operation of the partition. Alternatively, the unit may determine whether the data includes system parameters that, if lost, will require the halting of the partition. This information used to make these types of determinations could include the cache line address of the corrupted data, information retained by the operating system for the data, and/or on one or more fields within the data itself. The criteria selected for this purpose will be implementation specific.

If the corrupted data is determined to be critical (604), the maintenance processor is notified (606). The maintenance processor then issues messages to each of the other non-failing I/O modules and IPs within the affected partition, causing them to discontinue requesting data from the memory (608). Thereafter, the maintenance processor issues requests to each MSU that includes logic allocated to the affected partition. These messages prompt the MSU(s) to begin issuing requests to all non-failing I/O module(s) and/or IP(s) in the affected partition soliciting the return of any cache lines that have been retained by these units with ownership privileges (610). After all non-failing I/O modules and IPs have returned data in response to these requests (612), all queues of the ports within the affected partition, as well as all shared logic within the memory, will be cleared of requests and responses from units associated with the partition. In one embodiment, logic within the memory may then activate one or more state devices in the manner discussed above to notify the maintenance processor that the memory logic is in an idle state. Otherwise, maintenance processor can wait a predetermined time for this state to be attained. In either case, when the idle state is attained by each of the memory units having logic allocated to the affected partition, maintenance processor will initiate diagnostic activities for the partition (613).

Returning to step 604, if the data is not critical, recovery code executing within the partition, the operating system and/or on the maintenance processor will determine how to replace the corrupted data (614). Eventually, the replacement data, which is no longer corrupted, will be stored back to the appropriate memory unit with an ECC code that is determined based on the ECC scheme being employed by the system (616).

As described above, the current system and method allows error reporting and recovery to occur using transactions that are formatted in a manner that corresponds to the formatting of normal requests and responses. This can be appreciated by FIGS. 7 and 8.

Figure 7:
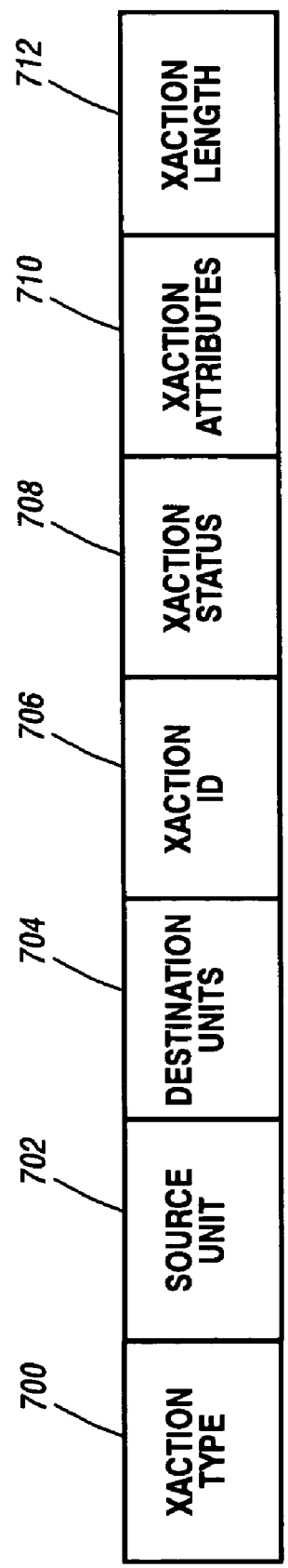
FIG. 7 is a block diagram illustrating some of the fields included in a transaction header according to one embodiment of the invention.

FIG. 7 is a block diagram illustrating some of the fields included in a transaction header according to one embodiment of the invention. This type of header is included in all requests and responses. The transaction type field 700 stores a value that indicates a type of request or response. Transaction types include a fetch request to retrieve data with write access privileges, or a store request to store data back to MSU 100A. Other transaction types include snoop requests and snoop responses.

The next two fields 702 and 704 identify the unit that generated the transaction, and the unit that will receive the transaction, respectively. These fields may identify a processor node, I/O module, MSU, or a maintenance processor. Field 706 provides the transaction ID, which is used to match a request with a later-issued response. As discussed above, this field is used by TTQ 204 to match a snoop response with the request for data that resulted in the issuance of a snoop request.

A next field 708 provides transaction status. This field may be used, for example, to return a status indicating the transaction failed, or will have to be retried in the future. Field 710 lists attributes associated with the transaction, as will be discussed below. Finally, field 712 provides a transaction length, which indicates the total length of the transaction, including any data that follows the header.

Figure 8:
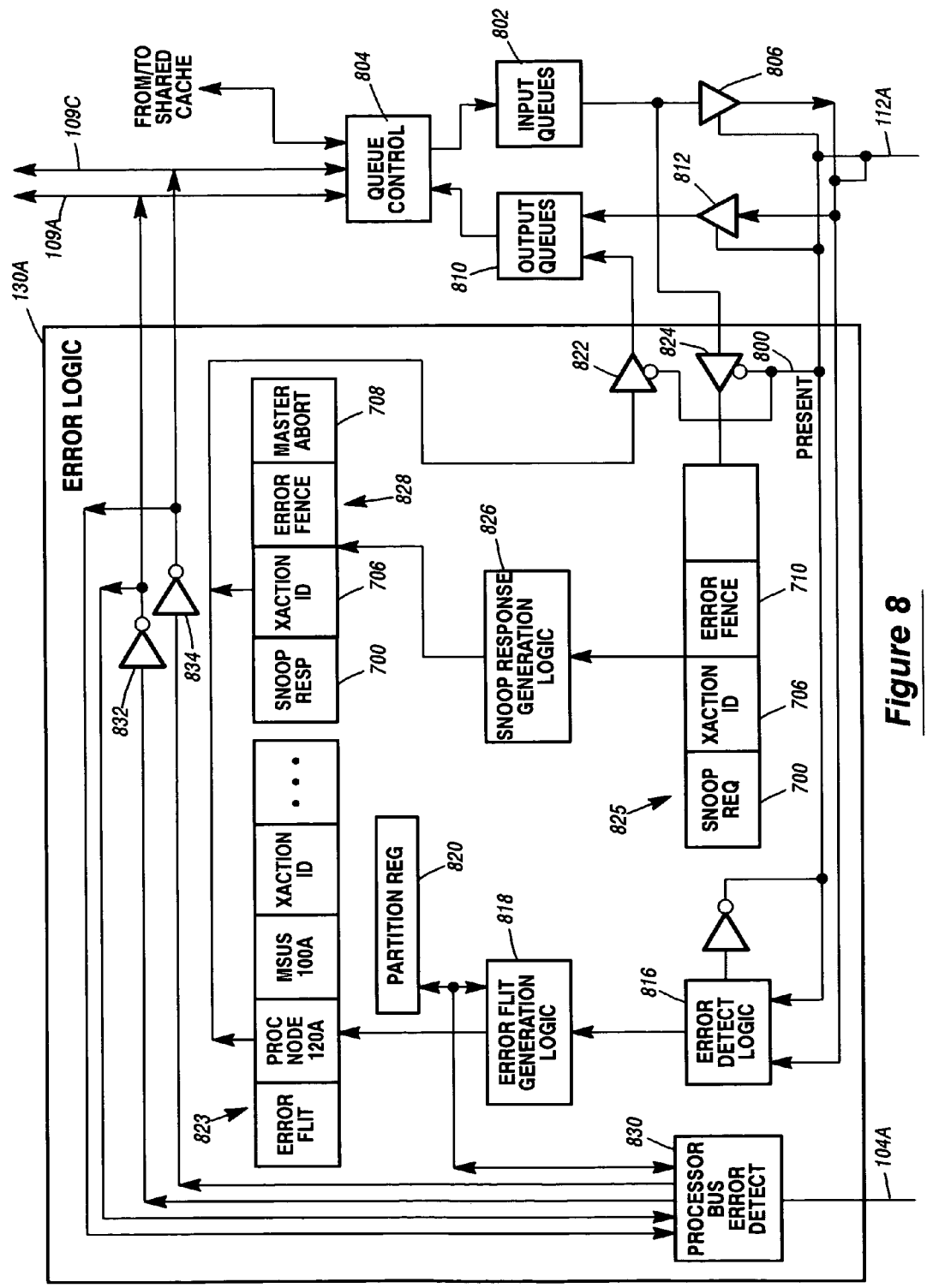
FIG. 8 is a logic block diagram illustrating error logic within the Processor Node Directory (PND).

FIG. 8 is a logic block diagram of a portion of error logic 130A that interfaces with I/O interface 111A. The I/O interface includes a Present signal illustrated on line 800. When this signal is activated, the I/O interface is allowed to receive transactions such as requests and responses from MI interfaces 109A and 109C, and from shared cache logic 106A. These transactions are temporarily stored within one of multiple queues illustrated collectively as input queues 802, which are controlled by queue control logic 804. The stored transactions are eventually provided to I/O interfaces via driver 806, which is enabled by the Present signal.

I/O interface 112A also provides transactions such as requests and responses to multiple output queues via driver 812, which is enabled by the Present signal. The multiple output queues are shown collectively as output queues 810 for simplicity. These stored transactions are destined for one of the MI interfaces 109A and 109C, or for shared cache logic 106A.

As requests and responses flow between the input and output queues 802 and 810, respectively, and I/O interface 112A, the signals on this interface are monitored by error detect logic 816. This logic checks that each of the fields within each transaction includes valid values, and that the transaction length field stores a value accurately reflecting the transaction length. Parity checking is also performed. If any of these checks detects an error, error detect logic 816 will deactivate the Present signal on line 800. This signal may also be deactivated by one of I/O modules 111A if that unit determines that a failure is occurring within the logic with which it is associated, or on the I/O interface itself.

If error detect logic 816 detects an error, or if it instead detects the deactivation of the Present signal by some other unit, error detect logic will signal error flit generation logic 818 to generate one or more error flits. Each error flit 823 has a transaction header that includes the fields shown in FIG. 7, some of which are omitted in FIG. 8 for clarity. The transaction type field 700 will indicate the transaction is an error flit. The destination field 704 will be set to indicate this transaction is to be provided to an MSU that is directly coupled to processor node 120A and that includes logic within the same processing partition as the processor node. This is determined by partition information stored within partition register 820, which is initialized by maintenance processor 124 when the partition is created. For a system that includes the partitions of FIG. 3, for example, an error flit will be generated for each of MSUs 100A and 100B. The source field 702 will identify processor node 120A, and a transaction ID field will include a unique value identifying the transaction.

Each error flit will be stored with output queues 810, which is enabled to receive transactions from error logic via driver 822. This driver is enabled by deactivation of the Present signal on line 800. The error flits will be routed to the appropriate MI 109A or 109B via queue control logic 804.

When an MSU receives an error flit, it will initiate the type of error recovery actions discussed above. These actions may include the issuance of pending snoop requests to processor node 120A. These requests are not provided to I/O interface 112A since drivers 806 and 812 have been disabled by the deactivated Present signal. Instead these requests are intercepted by error logic 130A via enabled driver 824.

A snoop request 825 that is provided after the MSU receives the error flit will include a transaction type field 700 identifying the transaction as a snoop request, and will include a transaction attributes field 710 that includes an activated error fence indicator. Snoop response generation logic 826 will utilize this request to generate a snoop response 828. The transaction type field 700 within this response is set to "snoop response", the transaction ID field 706 remains the same at that provided in the request, the contents of the source and destination fields from the snoop request are swapped, and the error fence indicator remains activated in field 710. The transaction status field 708 is set to "master abort". After generation of the snoop response is complete, it is stored to output queues 810 via driver 822, and is returned to the MSU that originated the snoop request.

Error logic 130A also includes processor bus error logic 830 that interfaces to processor bus 104A to detect various types of protocol, parity, and signal errors. If such errors are detected, processor bus error logic 830 uses partition register 820 to determine which MSUs are in the affected partition. This logic then utilizes drivers 832 and 834 to deactivate the appropriate one(s) of the Present signals on MIs 109A and 109C. This logic also detects the deactivation of this signal by another unit such as an MSU so that recovery actions can be initiated within the processor node should this occur.

The error logic 250A within ports 200A and 200B is similar to that illustrated in FIG. 8. For example, error logic 250A includes circuitry to detect errors on MI interfaces, and to deactivate the associated Present signal should an error be detected. Logic is also provided to generate snoop responses from snoop requests, and to provide error flits received from central error logic 260 to TTQ 204.

Figure 9:
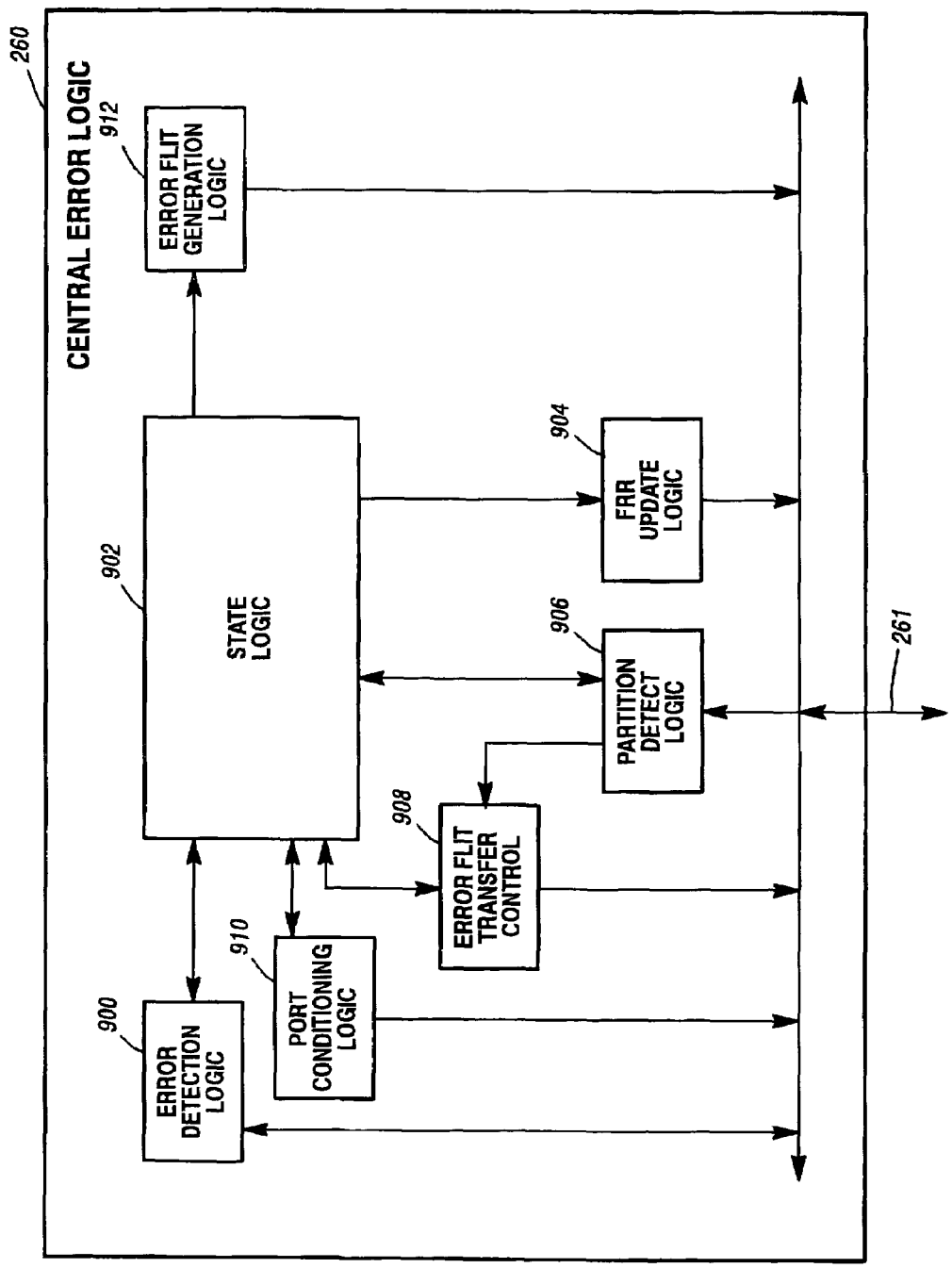
FIG. 9 is a logic block diagram illustrating central error logic within a Memory Storage Unit (MSU).

FIG. 9 is a block diagram illustrating central error logic 260 of MSU 100A. It will be understood that other MSUs include similar logic. Central error logic interfaces to TTQ 204, partition registers 264, FRR 240, and the four ports 200A-200D of MSU 100A via interface 261. Error detection logic 900 uses interface 261 to monitor requests as they are entered into TTQ 204. If an error flit is detected for a non-fatal fault, error detection logic 900 will notify state logic 902 with information contained in the error flit. State logic will cause FRR update logic 904 to update the FRR to record the failing requester. Any other error flit received by a port of MSU 100A that is destined for a different MSU will be routed from either port 200A or 200B to the appropriate one of ports 200C or 200D and transferred to that MSU in the manner discussed above.

Central error logic 260 also handles fatal faults as follows. When a Present signal is deactivated on any of interfaces 109A, 109B, 304, or 306 by either an MSU or by a processor node, the error logic for the associated port provides a signal to error detection logic 900. Error detection logic then notifies state logic 902. State logic causes partition detect logic 906 to determine from partition registers 264 which other ports are in the same partition as the port associated with the deactivated Present signal. State logic 902 then causes port conditioning logic 910 to assert signals on interface 261 to deactivate the respective Present signals on all other ports in the same partition.

In addition, port conditioning logic 910 provides conditioning signals to each of the ports in the affected partition to condition the ports for operation in recovery mode. In particular, these conditioning signals work in conjunction with the error logic in the respective ports to cause the ports to discontinue monitoring flow control signals on the associated interface. As discussed above, flow control signals are used to determine when requests and responses may be issued by the MSU to the associated interface. When these signals are disregarded during recovery operation, certain requests and responses may be issued to the interface by the MSU at any time as a means of discarding this transactions.

The conditioning signals provided by port conditioning logic 910 further enables the error logic within the ports to intercept certain requests so that pseudo responses can be generated. For example, all snoop requests that are directed to a unit associated with a disabled interface will be turned around by the port error logic and provided back to TTQ 204 as a snoop response in the manner discussed above. Similarly, error flits generated by error flit generation logic 912 will be turned around by the port error logic, as described above.

After each port in the failing partition has been conditioned by port conditioning logic 910, state logic 902 signals error flit generation logic 912 to generate an error flit that is issued to each port included within failing partition. The error flit is built with a unit identifier associated with the port. For example, port 200A will be issued an error flit with an identifier indicating PND 102A failed, and etc. The port error logic then re-directs the error flit to TTQ 204 where it is detected by error detection logic 900 in the above-described manner. State logic 902 is signaled, and FRR update logic 904 is enabled to update FRR register to record the identity of the failing unit. Thereafter, request and response processing may continue in the manner described above for a fatal fault.

Central error logic 260 is also used to detect a fault that occurred because of an internal MSU error that is determined to be fatal to one or both partitions using the MSU. In this case, error detection logic 900 detects the fault using parity, ECC, and other MSU status signals provided on interface 261. When such an error is detected, state logic 902 is signaled. State logic 902 then causes port conditioning logic 910 to assert signals on interface 261 to deactivate all of the MSU ports. In addition, port conditioning logic 910 provides conditioning signals to each of the ports to condition the ports for operation in recovery mode in the manner discussed above. Next, state logic 902 signals error flit generation logic 912 to generate an error flit that is issued to each of the MSU ports with a unit identifier, as discussed above. When the error flit is received by a port, it is then re-directed to TTQ 204. Each error flit provided to the TTQ in this manner is detected by error detection logic 900. State logic 902 is signaled, and FRR update logic 904 is enabled to update FRR register to record the identity of the failing unit. Thereafter, request and response processing continues in the manner described above for a fatal fault.

The above-described system and method provides a mechanism for a multi-partition data processing environment that supports fault recovery in a manner that allows non-affected partitions to continue executing without being impacted by the fault. In addition, if the failure is considered non-fatal, units and interfaces included within the same partition as, but that are not directly affected by, the fault may continue to execute without being impacted by error recovery. The functionality is provided without requiring specialized error and recovery interfaces. Fault reports and failure activities are completed using transactions that are structured as are any other requests and responses. Moreover, the same queue, state, and control logic that provides transaction flow control during normal (non-error) transaction processing is also used to support error recovery and fault handling.

This also minimizes the amount of specialized logic that is required to complete recovery actions. Moreover, all error reporting is performed via the same interfaces that support normal transaction processing, and the same transaction flow control the supports request and response handling during normal processing activities also supports fault recovery actions.

It will be appreciated that many alternative embodiments of the foregoing system and method are possible within the scope of the current invention. For example, in the above embodiment, each MSU is limited to supporting two processing partitions. Other embodiments wherein each MSU supports more than two processing partitions is possible, however. Thus, the embodiments presented herein are to be considered exemplary only, and the scope of the invention is indicated only by the claims that follow rather than by the foregoing description.

What is claimed is:

1. A method for performing error recovery in a data processing system capable of supporting two processing partitions, each containing one or more units, wherein a resource of the data processing system is shared between the processing partitions, the method comprising:
   detecting an error within logic allocated to a first of the processing partitions;
   identifying a unit of the data processing system associated with the error;
   removing from the logical state of the resource all effects of requests and responses from the identified unit to the resource while allowing the processing partition not affected by the error to continue using the resource; and
   allowing another unit within the first of the processing partitions to determine whether data that is stored within the resource and which is flagged as corrupted data as a result of the error should be recovered because it is considered non-critical to operation of the first of the processing partitions.

2. The method of claim 1, and further including removing from the logical state of the resource all effects of requests and responses from the resource to the identified unit.

3. The method of claim 2, and further including:
   generating a request requesting that the identified unit return data to the resource; and
   generating a pseudo response to the request on behalf of the identified unit that indicates the data is to be flagged as corrupted.

4. The method of claim 3, and further including:
   storing the corrupted data within the resource;
   providing the corrupted data to the other unit within the first partition; and
   allowing the other unit that is provided the corrupted data to determine whether to recover the corrupted data based on whether the corrupted data is considered non-critical to operation of the first partition.

5. The method of claim 1, and further including:
   determining whether the error is fatal; and
   if the error is not fatal, allowing other units included within the first partition to continue making requests to the resource without undergoing recovery operations.

6. The method of claim 5, and if the error is fatal, further including removing from the logical state of the resource all effects of requests and responses from any unit in the first partition to the resource while allowing the processing partition not affected by the error to continue using the resource.

7. The method of claim 6, and further including:
   removing from the logical state of the resource all effects of requests and responses from the resource to any unit in the first partition; and
   halting all units included within the first partition.

8. A data processing system, including:
   multiple requesters;
   a first memory unit coupled to receive requests from the multiple requesters;
   partition logic provided in the first memory unit to group the requesters into multiple, independently operable, processing partitions, more than one of the partitions sharing the first memory unit;
   a first transaction tracker within the first memory unit to receive requests and responses from requesters included in a first partition that is sharing the first memory unit, and if a fault is detected and associated with a requester in the first partition, the first transaction tracker to cause the effects of all pending requests and responses from the associated requester to be removed from the first memory unit while requests and responses continue to be processed from the other partitions sharing the first memory unit; and
   recovery logic within another requester of the first partition to recover corrupted data that has been corrupted within the first memory unit as a result of the fault if the corrupted data is not considered critical.

9. The system of claim 8, wherein the first transaction tracker includes state logic to determine whether the fault is a fatal error, and if so, the state logic to cause the effects of all pending requests and responses from all requesters in the first partition to be removed from the first memory unit while requests and responses continue to be processed from the other partitions.

10. The system of claim 8, wherein the first transaction tracker includes logic to issue pending requests from the first memory unit to the associated requester to solicit return of data and access rights from the associated requester;
    error logic coupled to the associated requester to return from the associated requester status indicating the data is corrupted; and
    state logic within the first transaction tracker to corrupt the copy of the data stored within the first memory unit.

11. The system of claim 10, and further including:
    response logic within the first memory unit to provide the corrupted data to another requester within the first partition; and
    wherein the recovery logic within the other requester modifies the corrupted data to an uncorrupted state if the corrupted data is not considered critical.

12. The system of claim 8, and further including:
    one or more additional memory units coupled to the first memory unit and included within the first partition, each of the additional memory units being capable of being included within at least one other of the multiple partitions;
    port logic within the first memory unit to provide a notification of the fault to the additional memory units; and
    a transaction tracker within each of the additional memory units to receive requests and responses from requesters included in the first partition, each transaction tracker to cause the effects of all pending requests and responses from the associated requester to be removed from the additional memory unit while requests and responses may continue to be processed from any other of the processing partitions within which the addition memory unit is included.

13. The system of claim 8, wherein the first memory unit includes multiple ports coupled to the first transaction tracker, each port associated with the more than one of the partitions sharing the first memory unit, and wherein the first transaction tracker includes state logic to cause all requests and responses from the associated requester that are stored within any port associated with the first partition to be processed to remove the effects of the pending requests and responses from the associated requester from the ports associated with the first partition.

14. For use in a data processing system having at least two processing partitions, each including one or more requesters, each processing partition utilizing a shared memory, a method of recovering from a fault in a first of the processing partitions, comprising:

deactivating an interface associated with the fault;

reporting the fault to the shared memory using a same interface used to provide requests from the requesters to the shared memory;

removing the affects of the fault from the shared memory without discontinuing the processing of requests from one or more requesters in the other processing partition; and for corrupted data stored within the shared memory that has been corrupted because of the fault, allowing a requester in the first processing partition that is not associated with the fault to recover the corrupted data if the corrupted data is determined to be non-critical.

15. The method of claim 14, wherein the removing step includes:

associating the fault with a requester;

determining which processing partition includes the associated requester;

for each write request from the associated requester that was being received by the shared memory when the fault was reported, storing corrupted data to the shared memory.

16. The method of claim 14, wherein the removing step includes:

associating the fault with a requester;

determining which processing partition includes the associated requester;

for each read request that is pending at the time the fault is reported, and that was issued by the requester in the first processing partition not associated with the fault, and further that requests data that is retained with write access privileges by the associated requester, storing corrupted data to the shared memory.

17. The method of claim 16, and if the fault is determined to be non-fatal, further including:

allowing the requester not associated with the fault to obtain a copy of the corrupted data stored within the shared memory;

allowing the requester not associated with the fault to update the copy with uncorrupted data if the data is determined to be non-critical; and storing the updated copy back to the shared memory.

18. The method of claim 14, wherein the shared memory is coupled to one or more additional shared memories that are each utilized by the first processing partition, and further including:

providing a notification of the fault from the shared memory to each of the additional shared memories; and removing the affects of the fault from each of the additional shared memories without discontinuing processing of requests from any other partition that may also be using the additional shared memories.

19. The method of claim 14, and including:

determining the fault is fatal; and processing all requests and responses from each requester in the first processing partition in a predetermined manner to place the shared memory in a state that allows the other processing partition to continue operating unaffected.

20. For use in a data processing system that is capable of supporting multiple processing partitions, the data processing system having request and response processing logic to process requests and responses from units in the data processing system, a fault recovery system comprising:

means for mapping each of the units to one or more of the processing partitions, and wherein at least one of the units is shared between two of the partitions;

means for receiving a fault notification indicating one of the units is associated with a fault;

means for utilizing the request and response processing logic of the data processing system to remove the effects of the fault from the at least one shared unit such that units mapped to processing partitions not affected by the fault may continue to make requests and responses to the at least one shared unit; and means within one of the units not associated with the fault for recovering corrupted data stored within the at least one of the units shared between two of the partitions if the corrupted data is determined to be non-critical.

* * * * *